US011714583B2

(12) United States Patent
Fukuchi et al.

(10) Patent No.: US 11,714,583 B2
(45) Date of Patent: Aug. 1, 2023

(54) PRINT DATA GENERATING DEVICE AND PRINTING DEVICE GENERATING PRINT DATA FOR CREATING PRINTED MEDIUM

(71) Applicant: BROTHER KOGYO KABUSHIKI KAISHA, Nagoya (JP)

(72) Inventors: Isao Fukuchi, Gifu (JP); Akira Minami, Nagoya (JP); Keisuke Nishihara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/562,804

(22) Filed: Dec. 27, 2021

(65) Prior Publication Data
US 2022/0206723 A1 Jun. 30, 2022

(30) Foreign Application Priority Data
Dec. 28, 2020 (JP) .................................. 2020-219635

(51) Int. Cl.
*G06F 3/12* (2006.01)
*G06K 15/02* (2006.01)

(52) U.S. Cl.
CPC .......... *G06F 3/1208* (2013.01); *G06F 3/1254* (2013.01); *G06F 3/1284* (2013.01); *G06K 15/028* (2013.01)

(58) Field of Classification Search
CPC .................................................... G06F 3/1208

USPC .......................................................... 358/1.6
See application file for complete search history.

(56) References Cited

U.S. PATENT DOCUMENTS

| | | | |
|---|---|---|---|
| 2017/0249107 A1* | 8/2017 | Nakagawa | G06K 15/186 |
| 2019/0377277 A1* | 12/2019 | Ogawa | B41J 2/3558 |
| 2020/0016905 A1 | 1/2020 | Tsuchiya et al. | |
| 2020/0210117 A1* | 7/2020 | Miyasaka | G06F 3/1258 |

FOREIGN PATENT DOCUMENTS

| | | |
|---|---|---|
| JP | 2008-006830 A | 1/2008 |
| JP | 2020-15315 A | 1/2020 |
| WO | 02/096665 A1 | 12/2002 |

* cited by examiner

*Primary Examiner* — Jacky X Zheng
(74) *Attorney, Agent, or Firm* — Kenealy Vaidya LLP

(57) ABSTRACT

A print data generating device is configured to generate print data for creating a printed medium by printing a target image on a heat-sensitive medium with a printing device. The printing device includes a thermal head having a heating element. The heat-sensitive medium includes: a base material; and a heat-sensitive layer. The base material has a transparency. The heat-sensitive layer is provided over one surface of the base material and is configured to develop a first color when heated to a first temperature or higher. The printing device is configured to control the heating element according to the print data to heat the heat-sensitive medium. The print data generating device includes a controller. The controller is configured to perform: (a) determining a condition of a background area on which the heat-sensitive medium is to be superimposed; and (b) generating the print data in accordance with the condition determined in (a).

30 Claims, 17 Drawing Sheets

PRINT DATA GENERATING DEVICE AND PRINTING DEVICE GENERATING PRINT DATA FOR CREATING PRINTED MEDIUM

CROSS REFERENCE TO RELATED APPLICATIONS

This application claims priority from Japanese Patent Application No. 2020-219635 filed Dec. 28, 2020. The entire content of the priority application is incorporated herein by reference.

BACKGROUND

A printing device known in the art prints images on a printing medium comprising a plurality of image-forming layers laminated on a base material. The printing device prints by applying heat from heating elements to the printing medium. Each of the image-forming layers produces a different color when heat is applied. The printing device generates print data for driving the heating elements based on the type of the printing medium from among a plurality of printing medium types that differ from each other in the order that the image-forming layers are laminated.

SUMMARY

However, the base material of the printing medium may possess a color. The adherend on which the printed printing medium is affixed may also possess a color. Since the conventional printing device described above generates print data irrespective of the colors of the base material and adherend, colors produced in the image-forming layers become mixed with the colors of the base material and adherend in such cases. As a consequence, printed printing media and printing media superposed on adherends may not achieve the colors desired by the user of the printing device.

Additionally, the user of the printing device may use a plurality of printed printing media by overlaying the printing media on one another. Here, when a second printing medium is overlaid on a first printing medium, the design formed on the second printing medium may deviate in position from the design provided on the first printing medium, diminishing the appearance of the laminated printing media. In such cases, the user of the conventional printing device may not obtain the desired printing medium since the printing device generates print data without consideration for conditions of the base material, adherend, or other printing medium constituting the background.

In view of the foregoing, it is an object of the present disclosure to provide a print data generating device and a printing device capable of creating printed medium suited to conditions of the background area.

(1) In order to attain the above and other objects, according to one aspect, the present disclosure provides a print data generating device. The print data generating device is configured to generate print data for creating a printed medium by printing a target image on a heat-sensitive medium with a printing device. The printing device includes a thermal head. The thermal head has a heating element. The heat-sensitive medium includes: a base material; and a first heat-sensitive layer. The base material has a transparency and includes one surface. The first heat-sensitive layer is provided over the one surface of the base material. The first heat-sensitive layer is configured to develop a first color when heated to a first temperature or higher. The printing device is configured to control the heating element according to the print data to heat the heat-sensitive medium. The print data generating device includes a controller. The controller is configured to perform: (a) determining; and (b) generating. The (a) determining determines a condition of a background area on which the heat-sensitive medium is to be superimposed. The (b) generating generates the print data in accordance with the condition of the background area determined in (a).

According to aspect (1), the print data generating device generates print data in accordance with a condition of a background area. Consequently, an appropriate printed medium can be created in accordance with the condition of the background area by transferring the print data from the print data generating device to a printing device.

(2) In the print data generating device according to aspect (1), it is preferable that the heat-sensitive medium further includes a second heat-sensitive layer. The second heat-sensitive layer is provided between the base material and the first heat-sensitive layer. The second heat-sensitive layer is configured to develop a second color when heated to a second temperature or higher. The second color is different from the first color. The second temperature is different from the first temperature.

According to aspect (2), the heat-sensitive medium includes a second heat-sensitive layer. Consequently, the print data generating device can generate the print data for printing images having diverse color tones through combinations of the first color and the second color.

(3) In the print data generating device according to aspect (1), it is preferable that the condition of the background area includes a color of the background area.

According to aspect (3), the print data generating device generates the print data in accordance with the color of the background area. Consequently, an appropriate printed medium can be created in accordance with the color of the background area by transferring the print data form the print data generating device to the printing device.

(4) In the print data generating device according to aspect (4), it is preferable that the condition of the background area include a color of an adherend on which the printed medium is to be overlaid.

According to aspect (4), the print data generating device generates the print data based on the color of the adherend on which the printed medium is to be overlaid. Consequently, an appropriate printed medium can be created in accordance with the color of the adherend by transferring the print data form the print data generating device to the printing device.

(5) In the print data generating device according to aspect (4), it is preferable that the printed medium is configured by bonding an adhesive medium to the heat-sensitive medium on one of: an opposite side of the first heat-sensitive layer from the base material; and an opposite side of the base material from the first heat-sensitive layer. It is also preferable that the adhesive medium includes: an adhesive base material; and an adhesive layer. The adhesive layer is provided over the adhesive base material. It is also preferable that the condition of the background area includes at least one of: a color of the adhesive base material; and a color of the adhesive layer.

According to aspect (5), the print data generating device generates the print data based on a color of at least one of the adhesive base material and the adhesive layer those are included in the adhesive medium to be bonded to the heat-sensitive medium. Consequently, an appropriate printed medium can be created in accordance with the color of the adhesive base material or adhesive layer by transferring the print data form the print data generating device to the printing device.

(6) In the print data generating device according to aspect (3), it is preferable that the controller is configured to further perform: (c) designating; and (d) generating. The (c) designating designates the color of the background area to be white. The (d) generating generates the print data in accordance with the color of the background area designated in (c). It is also preferable that the print data generating device is provided with: a first mode; and a second mode. The (a) determining and the (b) generating are performed for generating the print data in the first mode. The (c) designating and the (d) generating are performed for generating the print data in the second mode.

According to aspect (6), the print data generating device operating in the second mode can generate print data by designating the color of the background area to be white. This allows the print data generating device to generate the print data by omitting the determination when, for example, the determination as to the color of the background area is not needed. Consequently, the process executed by the print data generating device operating in the second mode can be simplified compared to the process executed by the print data generating device operating in the first mode in which the determination as to the color of the background area is made.

(7) Preferably, the print data generating device according to aspect (3) further includes a memory. The memory is configured to store color range information indicating a first color range that the heat-sensitive medium can reproduce when heated. It is also preferable that the (b) generating includes: (e) setting; (f) generating; and (g) converting. The (e) setting sets a second color range by reflecting the color of the background area determined in (a) in the first color range. The (f) generating generates temporary print data for printing the target image based on the second color range set in (e). The (g) converting converts the temporary print data to final print data for printing the target image based on the first color range.

According to aspect (7), the print data generating device generates temporary print data for printing the target image based on the second color range which is set by reflecting the color of the background area in the first color range, and converts the temporary print data to final print data for printing the target image based on the first color range. This suppresses color changes perceived by user of the printed medium depending on the color of the background area. Consequently, an appropriate printed medium can be created in accordance with the color of the background area by transferring the print data form the print data generating device to the printing device.

(8) In the print data generating device according to aspect (3), it is preferable that the background area includes: a first region on which the printed medium is to be superimposed; and a second region around the first region. It is also preferable that the (b) generating generates the print data based on at least one of: a color of the first region; and a color of the second region.

According to aspect (8), the print data generating device generates the print data based on at least one of a color of the first region of the background area on which the printed medium is to be superimposed and a color of the second region of the background area around the first region. This suppresses color changes perceive by user of the printed medium depending on the color of the first region or the color of the second region. Consequently, an appropriate printed medium can be created in accordance with the color of the background area by transferring the print data form the print data generating device to the printing device.

(9) In the print data generating device according to aspect (1), it is preferable that the controller is configured to further perform: (h) acquiring. The (h) acquiring acquires information on the background area. It is also preferable that the (a) determining determines the condition of the background area based on the information acquired in (h).

According to aspect (9), the print data generating device determines the condition of the background area based on the acquired information on the background area. This suppress a user of the printed medium to verify repeatedly whether the printed medium has been created based on the condition of the background area. Consequently, an appropriate printed medium can be created in accordance with the condition of the background area by transferring the print data form the print data generating device to the printing device.

(10) In the print data generating device according to aspect (9), it is preferable that the (h) acquiring acquires the information on the background area captured by an external terminal device having an imaging function.

According to aspect (10), the print data generating device acquires the information on the background area captured by an external terminal device to determine the condition of the background area. Since a user of the printed medium can easily provide the information on the background area, convenience of suing the print data generating device is improved.

(11) In the print data generating device according to aspect (1), it is preferable that the (b) generating generates the print data which assigns a color patch to an area in a margin of the printed medium outside the target image. The color patch includes at least one of colors red, blue, green, cyan. magenta, yellow, and black.

According to aspect (11), the print data generating device generates the print data which assigns a color patch to an area in a margin of the printed medium outside the target image. Accordingly, the print data generating device can identify a relative change in color by simultaneously acquiring the color of the background are and the color of the color patch. Consequently, the print data generating device can generate the print data that considers a more accurate color of the background area.

(12) In the print data generating device according to aspect (1), it is preferable that the background area includes a background printed medium which has been printed in advance.

According to aspect (12), the print data generating device generates the print data in accordance with the condition of a background printed medium when the background area includes the background printed medium which has been printed in advance. Consequently, an appropriate printed medium can be created in accordance with the condition of the background printed medium by transferring the print data form the print data generating device to the printing device.

(13) Preferably, the print data generating device according to aspect (12) further includes: a memory. The memory is configured to store shape information indicating a shape of a background image printed on the background printed medium. It is also preferable that the condition of the background area includes the shape of the background image. It is also preferable that the (a) determining determines the shape of the background image based on the shape information stored in the memory.

According to aspect (13), the print data generating device generates the print data based on the shape of a background image printed on the background printed medium. Consequently, an appropriate printed medium can be created in accordance with the shape of the background image by transferring the print data form the print data generating device to the printing device.

(14) In the print data generating device according to aspect (13), it is preferable that the (a) determining includes: (i) determining. The (i) determining determines whether a shape of the target image conforms the shape of the background image. It is also preferable that the (b) generating includes: (j) generating. The (j) generating generates, in response to determining in (i) that the shape of the target image conforms to the shape of the background image, the print data setting the shape of the target image to be smaller than the shape of the background image.

According to aspect (14), the print data generating device generates, in accordance with the shape of the background image printed on the background printed medium, the print data setting the shape of the target image to be smaller than the shape of the background image. This makes positional deviation between the background image and the target image more tolerable when a user overlays the created printed medium on the background printed medium.

(15) Preferably, the print data generating device according to aspect (12) further includes: a memory. The memory is configured to store color information indicating a color of the background printed medium. It is also preferable that the condition of the background area includes the color of the background printed medium. It is also preferable that the (a) determining includes: (k) determining. The (k) determining determines the color of the background printed medium based on the color information stored in the memory.

According to aspect (15), the print data generating device generates the print data in accordance with the color of the background printed medium. Consequently, an appropriate printed medium can be created in accordance with the color of the background printed medium by transferring the print data form the print data generating device to the printing device.

(16) In the print data generating device according to aspect (15), it is preferable that the (b) generating includes: (1) generating. The (1) generating generates the print data setting a color of the target image to be developed when the heat-sensitive medium is heated closer to the color of the background printed medium determined in (k).

According to aspect (16), the print data generating device generates the print data setting a color to be developed when the heat-sensitive medium is heated closer to the color of the background printed medium. This reduces the color difference between the color of the created printed medium and the color of the background printed medium. Consequently, a diminished appearance of the target image is suppressed when the created printed medium is overlaid on the background printed medium.

(17) According to another aspect, the present disclosure also provides a printing device. The printing device is configured to print a target image on a heat-sensitive medium. The heat-sensitive medium includes: a base material; and a first heat-sensitive layer. The base material has a transparency. The base material includes one surface. The first heat-sensitive layer is provided over the one surface of the base material. The first heat-sensitive layer is configured to develop a first color when heated to a first temperature or higher. The printing device includes: a thermal head; and a controller. The thermal head includes a heating element. The controller is configured to perform: (a) determining; (b) generating; and (c) controlling. The (a) determining determines a condition of a background area on which the heat-sensitive medium is to be superimposed. The (b) generating generates print data for printing the target image in accordance with the condition of the background area determined in (a). The (c) controlling controls, in accordance with the print data generated in (b), an amount of heat generated by the heating element to print the target image on the heat-sensitive medium.

According to aspect (17), the same effects as aspect (1) can be obtained.

(18) In the printing device according to aspect (17), it is preferable that the heat-sensitive medium further includes a second heat-sensitive layer. The second heat-sensitive layer is provided between the base material and the first heat-sensitive layer. The second heat-sensitive layer is configured to develop a second color when heated to a second temperature or higher. The second color is different from the first color. The second temperature is different from the first temperature.

According to aspect (18), the heat-sensitive medium includes a second heat-sensitive layer. Consequently, the printing device can print images having diverse color tones through combinations of the first color and the second color.

(19) In the printing device according to aspect (17), it is preferable that the condition of the background area includes a color of the background area.

According to aspect (19), the printing device generates the print data in accordance with the color of the background area, and controls, in accordance with the generated print data, the amount of heat generated by the heating element to print the target image. Consequently, an appropriate printed medium can be created in accordance with the color of the background area.

(20) In the printing device according to aspect (19), it is preferable that the condition of the background area include a color of an adherend on which the printed medium is to be overlaid.

According to aspect (20), the printing device generates the print data based on the color of the adherend on which the printed medium is to be overlaid, and controls, in accordance with the generated print data, the amount of heat generated by the heating element to print the target image. Consequently, an appropriate printed medium can be created in accordance with the color of the adherend.

(21) In the printing device according to aspect (19), it is preferable that the printed medium is configured by bonding an adhesive medium to the heat-sensitive medium on one of: an opposite side of the first heat-sensitive layer from the base material; and an opposite side of the base material from the first heat-sensitive layer. It is also preferable that the adhesive medium includes: an adhesive base material; and an adhesive layer. The adhesive layer is provided over the adhesive base material. It is also preferable that the condition of the background area includes at least one of: a color of the adhesive base material; and a color of the adhesive layer.

According to aspect (21), the printing device generates the print data based on a color of at least one of the adhesive base material and the adhesive layer those are included in the adhesive medium to be bonded to the heat-sensitive medium, and controls, in accordance with the generated print data, the amount of heat generated by the heating element to print the target image. Consequently, an appropriate printed medium can be created in accordance with the color of the adhesive base material or adhesive layer.

(22) In the printing device according to aspect (19), it is preferable that the controller is configured to further perform: (d) designating; and (e) generating. The (d) designating designates the color of the background area to be white. The (e) generating generates the print data in accordance with the color of the background area designated in (d). It is also preferable that the printing device is provided with: a first mode; and a second mode. The (a) determining and the (b) generating are performed for generating the print data in the first mode. The (d) designating and the (e) generating are performed for generating the print data in the second mode.

According to aspect (22), the printing device operating in the second mode can generate print data by designating the color of the background area to be white. This allows the printing device to generate the print data by omitting the determination when, for example, the determination as to the color of the background area is not needed. Consequently, the process executed by the printing device operating in the second mode can be simplified compared to the process executed by the printing device operating in the first mode in which the determination as to the color of the background area is made.

(23) Preferably, the print data generating device according to aspect (19) further includes a memory. The memory is configured to store color range information indicating a first color range that the heat-sensitive medium can reproduce when heated. It is also preferable that the (b) generating includes: (f) setting; (g) generating; and (h) converting. The (g) setting sets a second color range by reflecting the color of the background area determined in (a) in the first color range. The (g) generating generates temporary print data for printing the target image based on the second color range set in (f). The (h) converting converts the temporary print data to final print data for printing the target image based on the first color range.

According to aspect (23), the printing device generates temporary print data for printing the target image based on the second color range which is set by reflecting the color of the background area in the first color range, and converts the temporary print data to final print data for printing the target image based on the first color range. This suppresses color changes perceived by user of the printed medium depending on the color of the background area. Consequently, an appropriate printed medium can be created in accordance with the color of the background area.

(24) In the printing device according to aspect (19), it is preferable that the background area includes: a first region on which the printed medium is to be superimposed; and a second region around the first region. It is also preferable that the (b) generating generates the print data based on at least one of: a color of the first region; and a color of the second region.

According to aspect (24), the printing device generates the print data based on at least one of a color of the first region of the background area on which the printed medium is to be superimposed and a color of the second region of the background area around the first region, and controls, in accordance with the generated print data, the amount of heat generated by the heating element to print the target image. This suppresses color changes perceive by user of the printed medium depending on the color of the first region or the color of the second region. Consequently, an appropriate printed medium can be created in accordance with the color of the background area.

(25) In the printing device according to aspect (17), it is preferable that the controller is configured to further perform: (i) acquiring. The (i) acquiring acquires information on the background area. It is also preferable that the (a) determining determines the condition of the background area based on the information acquired in (i).

According to aspect (25), the printing device determines the condition of the background area based on the acquired information on the background area. This suppress a user of the printed medium to verify repeatedly whether the printed medium has been created based on the condition of the background area. Consequently, an appropriate printed medium can be created in accordance with the condition of the background area.

(26) In the printing device according to aspect (25), it is preferable that the (i) acquiring acquires the information on the background area captured by an external terminal device having an imaging function.

According to aspect (26), the printing device acquires the information on the background area captured by an external terminal device to determine the condition of the background area. Since a user of the printed medium can easily provide the information on the background area, convenience of suing the printing device is improved.

(27) In the print data generating device according to aspect (17), it is preferable that the (b) generating generates the print data which assigns a color patch to an area in a margin of the printed medium outside the target image. The color patch includes at least one of colors red, blue, green, cyan. magenta, yellow, and black.

According to aspect (27), the printing device generates the print data which assigns a color patch to an area in a margin of the printed medium outside the target image. Accordingly, the printing device can identify a relative change in color by simultaneously acquiring the color of the background are and the color of the color patch. Consequently, the printing device can generate the print data that considers a more accurate color of the background area.

(28) In the printing device according to aspect (17), it is preferable that the background area includes a background printed medium which has been printed in advance.

According to aspect (28), the printing device generates the print data in accordance with the condition of a background printed medium when the background area includes the background printed medium which has been printed in advance, and controls, in accordance with the generated print data, the amount of heat generated by the heating element to print the target image. Consequently, an appropriate printed medium can be created in accordance with the condition of the background printed medium.

(29) Preferably, the printing device according to aspect (28) further includes: a memory. The memory is configured to store shape information indicating a shape of a background image printed on the background printed medium. It is also preferable that the condition of the background area includes the shape of the background image. It is also preferable that the (a) determining determines the shape of the background image based on the shape information stored in the memory.

According to aspect (29), the printing device generates the print data based on the shape of a background image printed on the background printed medium, and controls, in accordance with the generated print data, the amount of heat generated by the heating element to print the target image. Consequently, an appropriate printed medium can be created in accordance with the shape of the background image.

(30) In the printing device according to aspect (29), it is preferable that the (a) determining includes: (j) determining. The (j) determining determines whether a shape of the target image conforms the shape of the background image. It is also preferable that the (b) generating includes: (k) generating. The (k) generating generates, in response to determining in (j) that the shape of the target image conforms to the shape of the background image, the print data setting the shape of the target image to be smaller than the shape of the background image.

According to aspect (30), the printing device generates, in accordance with the shape of the background image printed on the background printed medium, the print data setting the shape of the target image to be smaller than the shape of the background image, and controls, in accordance with the generated print data, the amount of heat generated by the heating element to print the target image. This makes positional deviation between the background image and the target image more tolerable when a user overlays the created printed medium on the background printed medium. Consequently, an appropriate printed medium can be created in accordance with the shape of the target image.

(31) Preferably, the printing device according to aspect (28) further includes: a memory. The memory is configured to store color information indicating a color of the background printed medium. It is also preferable that the condition of the background area includes the color of the background printed medium. It is also preferable that the (a) determining includes: (1) determining. The (1) determining determines the color of the background printed medium based on the color information stored in the memory.

According to aspect (31), the printing device generates the print data in accordance with the color of the background printed medium, and controls, in accordance with the generated print data, the amount of heat generated by the heating element to print the target image. Consequently, an appropriate printed medium can be created in accordance with the color of the background printed medium.

(32) In the printing device according to aspect (31), it is preferable that the (b) generating includes: (m) generating. The (m) generating generates the print data setting a color of the target image to be developed when the heat-sensitive medium is heated closer to the color of the background printed medium determined in (1).

According to aspect (32), the printing device generates the print data setting a color to be developed when the heat-sensitive medium is heated closer to the color of the background printed medium, and controls, in accordance with the generated print data, the amount of heat generated by the heating element to print the target image. This reduces the color difference between the color of the created printed medium and the color of the background printed medium. Consequently, a diminished appearance of the target image is suppressed when the created printed medium is overlaid on the background printed medium.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
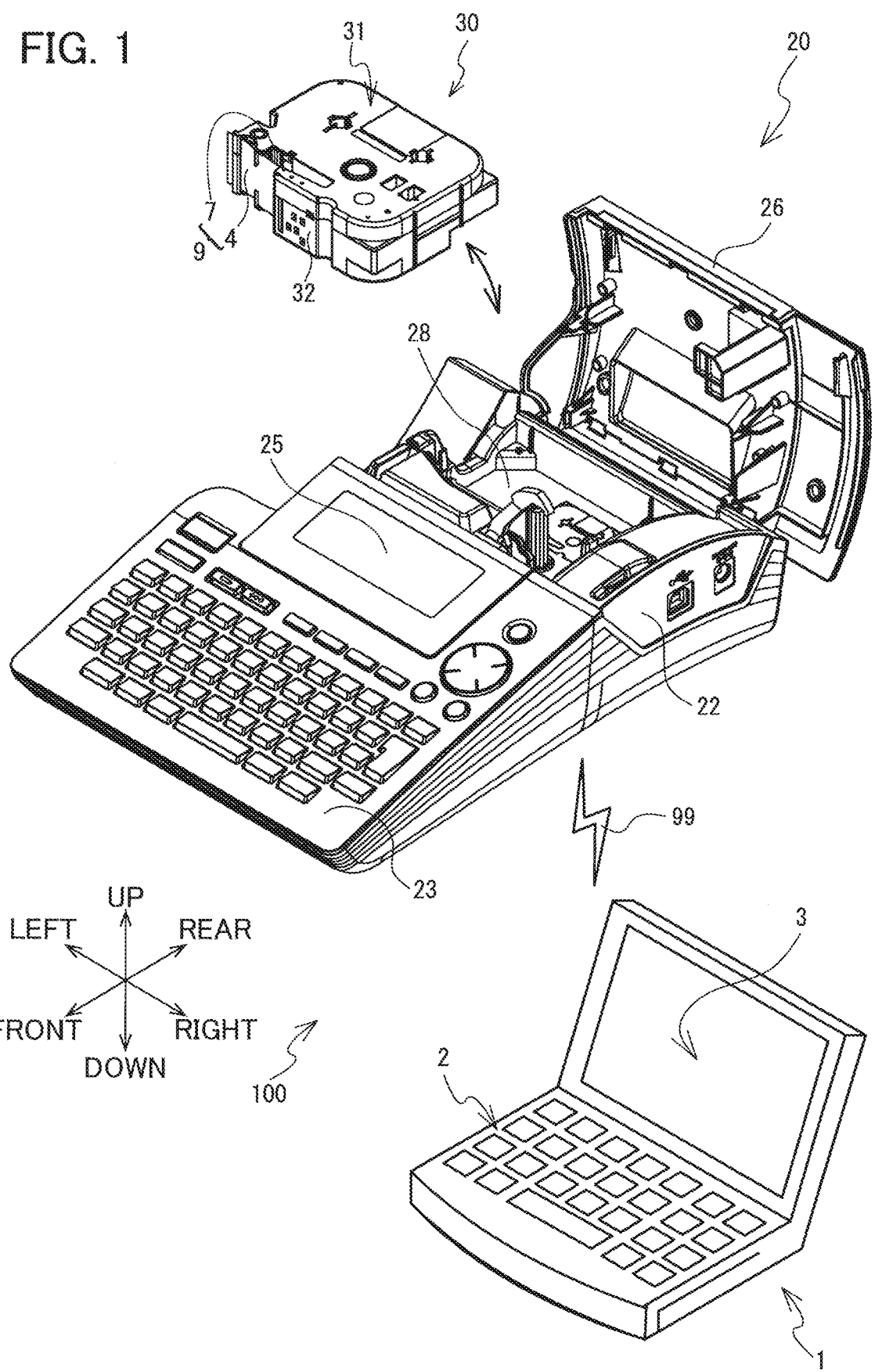
FIG. 1 is a perspective view of a printing system including a print data generating device and a printing device.

Hereinafter, an embodiment of the present disclosure will be described while referring to the accompanying drawings wherein like parts and components are designated by the same reference numerals to avoid duplicating description. The referenced drawings are used to describe the technical features made possible with the present disclosure. The configurations, control, and the like of the devices described below are merely examples, and the present disclosure is not intended to be limited to these configurations, control, and the like.

In the following description, the lower-left side, upper-right side, lower-right side, upper-left side, top side, and bottom side of a printing device 20 in FIG. 1 are respectively defined as the front side, rear side, right side, left side, top side, and bottom side of the printing device 20. The lower-left side, upper-right side, lower-right side, upper-left side, top side, and bottom side of a tape cassette 30 in FIG. 1 are respectively defined as the front side, rear side, right side, left side, top side, and bottom side of the tape cassette 30.

Structure of a Printing System 100

FIG. 1 shows a printing system 100. The printing system 100 is provided with a print data generating device 1, and the printing device 20. The print data generating device 1 is a common personal computer. The print data generating device 1 and printing device 20 can conduct two-way communication through a wireless connection 99.

The print data generating device 1 generates print data for creating a label tape 9. The printing device 20 uses a tape cassette 30 to print an image 90 (alphanumeric characters, graphics, symbols, or the like) on a heat-sensitive tape 4 (see FIG. 2A) based on print data received through the wireless connection 99. The printing device 20 creates the label tape 9 (see FIG. 2C) by bonding an adhesive tape 7 (see FIG. 2B) to the printed heat-sensitive tape 4. The label tape 9 is then used by affixing the label tape 9 to an adherend 11 (see FIG. 5), such as a wall, mount, or the like, or a separately prepared label tape 9.

Mechanical Configuration of the Printing Device 20

The printing device 20 is a common thermal printer. The printing device 20 is provided with a device body 22. The device body 22 has a box shape. A cassette cover 26 is provided on the top surface of the device body 22 in the rear section thereof. The cassette cover 26 covers the top of a cassette housing section 28 and can be opened and closed over the cassette housing section 28. The user opens and closes the cassette cover 26 when replacing the tape cassette 30. A discharge slit (not shown) is formed in the left surface of the rear portion of the device body 22. A discharge slit (not shown) is formed in the left surface of the rear portion of the device body 22. The discharge slit allows the label tape 9 to be discharged from the printing device 20.

The cassette housing section 28 is recessed downward from the top surface of the device body 22 and has a shape corresponding to the shape of the tape cassette 30. The tape cassette 30 is detachably mountable in the cassette housing section 28. The tape cassette 30 has a cassette case 31. The cassette case 31 has a substantially rectangular parallelepiped shape and accommodates the heat-sensitive tape 4 and adhesive tape 7.

An indicator 32 is provided on the front surface of the cassette case 31. The indicator 32 comprises hole parts and surface parts. Based on the positions and numbers of hole parts and surface parts, the indicator 32 indicates the tape type of the heat-sensitive tape 4 or adhesive tape 7 accommodated in the tape cassette 30. The tape type in the present embodiment includes information specifying the color of the adhesive tape 7, the transparency of the adhesive tape 7, and the types of chemicals used in the heat-sensitive tape 4.

A conveying roller (not shown) is provided in the left-front corner of the cassette case 31 and is rotatable about a vertical axis. The conveying roller is disposed along a conveying path for the heat-sensitive tape 4 and adhesive tape 7. The heat-sensitive tape 4 and adhesive tape 7 are pinched between the conveying roller and a movable roller described later.

A detecting part 29 (see FIG. 10), a thermal head 10 (see FIG. 10), and a movable roller (not shown) are provided in the cassette housing section 28. The detecting part 29 detects the positions and numbers of hole parts and surface parts in the indicator 32 on the tape cassette 30 that is mounted in the cassette housing section 28. The printing device 20 identifies the tape type based on the detection results from the detecting part 29.

The thermal head 10 is provided with a plurality of heating elements 10A (see FIG. 10) that are aligned in a direction orthogonal to the conveying direction. By applying heat, the thermal head 10 can form colored dots in the heat-sensitive tape 4. Specifically, the printing device 20 controls the heating elements 10A to intermittently heat the heat-sensitive tape 4 a plurality of times while conveying the heat-sensitive tape 4 based on print data generated by the print data generating device 1, thereby printing the image 90 on the heat-sensitive tape 4.

The movable roller is disposed to be rotatable about a vertical axis. The movable roller can move between an idle position and a printing position. The movable roller is configured to move toward the idle position when the cassette cover 26 is opened and to move toward the printing position when the cassette cover 26 is closed. In the idle position, the movable roller is moved in a direction away from the cassette housing section 28. Accordingly, the user can mount a tape cassette 30 in or remove a tape cassette 30 from the cassette housing section 28 while the movable roller is in the idle position. In the printing position, the movable roller is pressed against the conveying roller.

The printed heat-sensitive tape 4 and the adhesive tape 7 pass between the conveying roller and movable roller. The movable roller pinches the heat-sensitive tape 4 and adhesive tape 7 in their superimposed state against the conveying roller to bond the heat-sensitive tape 4 and adhesive tape 7 together, thereby forming the label tape 9. The label tape 9 is subsequently discharged from the tape cassette 30 and cut by a cutting mechanism (not shown). Once cut, the label tape 9 is discharged from the printing device 20 through the discharge slit formed in the device body 22.

Structure of the Heat-Sensitive Tape 4

Figure 2A:
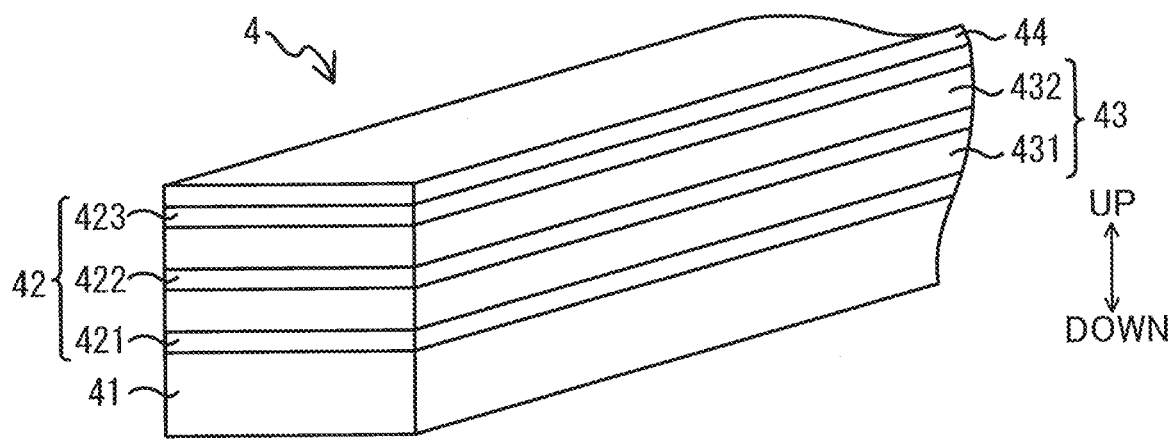
FIG. 2A is a perspective view of a heat-sensitive tape used in a tape cassette mounted in the printing device.

In the following description, the top side and bottom side of tape shown in FIGS. 2A through 2C will be referred to as the top and bottom of the tape. As shown in FIG. 2A, the heat-sensitive tape 4 is a long strip of a medium configured of a plurality of laminated layers. Specifically, the heat-sensitive tape 4 has abase material 41, a plurality of heat-sensitive layers 42, a plurality of heat-insulating layers 43, and an overcoat layer 44 (hereinafter collectively referred to as the "layers of the heat-sensitive tape 4"). In the present embodiment, the heat-sensitive layers 42 include a first heat-sensitive layer 421, a second heat-sensitive layer 422, and a third heat-sensitive layer 423. The heat-insulating layers 43 include a first heat-insulating layer 431, and a second heat-insulating layer 432.

The base material 41, first heat-sensitive layer 421, first heat-insulating layer 431, second heat-sensitive layer 422, second heat-insulating layer 432, third heat-sensitive layer 423, and overcoat layer 44 are laminated in the thickness direction of the heat-sensitive tape 4 (the vertical direction in FIG. 2A) in the order given, beginning from the bottom of the heat-sensitive tape 4. Thus, the overcoat layer 44 is provided opposite the base material 41 with respect to the heat-sensitive layers 42. Specifically, the overcoat layer 44 constitutes the top surface of the heat-sensitive tape 4. Hereinafter, the surface of the base material 41 on which the first heat-sensitive layer 421 is laminated will be called a first surface.

The base material 41 is a resin film, and specifically a non-foamed polyethylene terephthalate (PET) film. In other words, gas bubbles are not trapped inside the base material 41.

Each of the heat-sensitive layers 42 produces a corresponding color when heated to a color-developing temperature specific to that layer. The heat-sensitive layers 42 achieves this effect through the use of chemicals, such as those described in Japanese Patent Application Publication No. 2008-006830.

The first heat-sensitive layer 421 is formed as a film by coating the bottom surface of the first heat-insulating layer 431 with a chemical agent. The first heat-sensitive layer 421 produces a first color when heated to a first temperature or higher. In the present embodiment, the first color is cyan.

The second heat-sensitive layer 422 is formed as a film by coating the bottom surface of the second heat-insulating layer 432 with a chemical agent. The second heat-sensitive layer 422 produces a second color when heated to a second temperature or higher. The second temperature is higher than the first temperature. In the present embodiment, the second color is magenta.

The third heat-sensitive layer 423 is formed as a film by coating the top surface of the second heat-insulating layer 432 with a chemical agent. The third heat-sensitive layer 423 produces a third color when heated to a third temperature or higher. The third temperature is higher than the second temperature. In the present embodiment, the third color is yellow.

In the heat-sensitive tape 4 of the present embodiment, the first color is cyan, the second color is magenta, and the third color is yellow. Hence, the first heat-sensitive layer 421, second heat-sensitive layer 422, and third heat-sensitive layer 423 together produce all three primary colors. Accordingly, the heat-sensitive tape 4 can express numerous colors (a color display) by combining the primary colors produced in the heat-sensitive layers 42.

The heat-insulating layers 43 are sheet-like layers. Owing to their low thermal conductivity, the heat-insulating layers 43 function as resistors to heat conduction. Using the effect of the heat-insulating layers 43, the heat-sensitive tape 4 is configured to deliberately control the temperature of the first heat-sensitive layer 421 to be higher than a first temperature and lower than a second temperature, the temperature of the second heat-sensitive layer 422 to be higher than the second temperature and lower than a third temperature, and the temperature of the third heat-sensitive layer 423 to be higher than the third temperature when the thermal head 10 applies heat to the heat-sensitive tape 4.

The overcoat layer 44 is formed as a film by coating the top surface of the third heat-sensitive layer 423. The overcoat layer 44 protects the heat-sensitive layers 42 from the side opposite the base material 41 (i.e., the top surface of the heat-sensitive layers 42).

Overall, the heat-sensitive tape 4 has visible light transmittance (transparency) in the thickness direction of the heat-sensitive tape 4. In other words, all layers of the heat-sensitive tape 4 have transparency. The visible light transmittance (%) of the base material 41 may be the same as the visible light transmittance of at least of the heat-sensitive layer 42, heat-insulating layer 43, and overcoat layer 44, or may differ from the visible light transmittance of all three layers. The visible light transmittance for each layer of the heat-sensitive tape 4 is at least 90%, for example, and preferably at least 99%, and more preferably at least 99.9%. Even if the visible light transmittance for each layer is less than 90%, the transparency for each layer should be at least sufficiently high for the user to visualize colors produced in the heat-sensitive layers 42 through the base material 41. The layers of the heat-sensitive tape 4 may be transparent or translucent, but are preferably transparent.

Structure of the Adhesive Tape 7

Figure 2B:
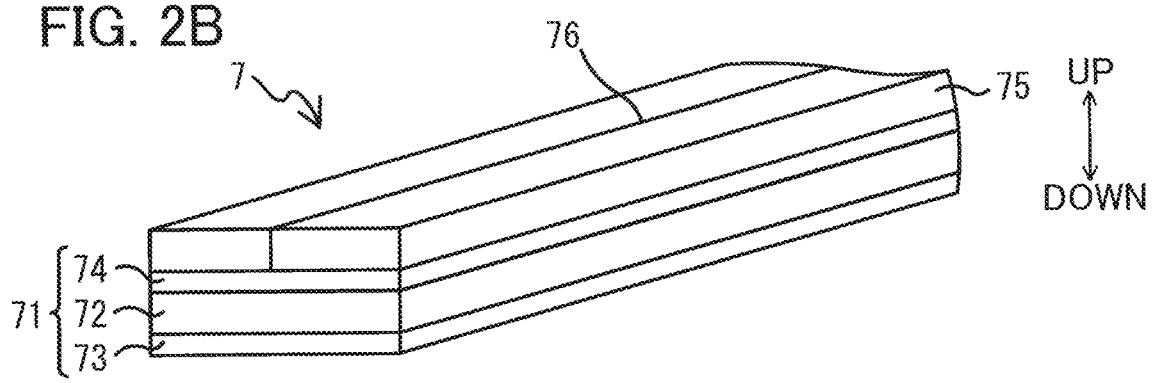
FIG. 2B is a perspective view of an adhesive tape used in the tape cassette mounted in the printing device.

As shown in FIG. 2B, the adhesive tape 7 is a long strip-like medium and is configured of a plurality of laminated layers. Specifically, the adhesive tape 7 is provided with a double-sided adhesive tape 71, and a release paper 75. The double-sided adhesive tape 71 is translucent magenta, for example. The double-sided adhesive tape 71 has a base material 72, a first adhesive layer 73, and a second adhesive layer 74. The base material 72 is translucent magenta. In FIG. 2B, the base material 72 (the double-sided adhesive tape 71) is filled with oblique lines to represent the translucent magenta. (This also applies to FIG. 2C.) In the present embodiment, the visible light transmittance of the base material 72 is lower than the visible light transmittance of each layer in the heat-sensitive tape 4.

The first adhesive layer 73 is provided on the bottom surface of the base material 72, and the second adhesive layer 74 is provided on the top surface of the base material 72. That is, the double-sided adhesive tape 71 is configured by applying adhesive to both top and bottom surfaces of the base material 72. In the present embodiment, the first adhesive layer and second adhesive layer are transparent or translucent.

The release paper 75 is bonded to the double-sided adhesive tape 71 through the second adhesive layer 74. A score line 76 is formed in the release paper 75. The score line 76 extends in the longitudinal direction of the adhesive tape 7 and divides the release paper 75 in two in the lateral direction. The score line 76 also penetrates into a portion of the double-sided adhesive tape 71, but does not reach the first adhesive layer 73. In other words, the base material 72 is formed continuously across the score line 76 and, thus, the double-sided adhesive tape 71 is formed continuously across the score line 76.

Structure of the Label Tape 9

Figure 2C:
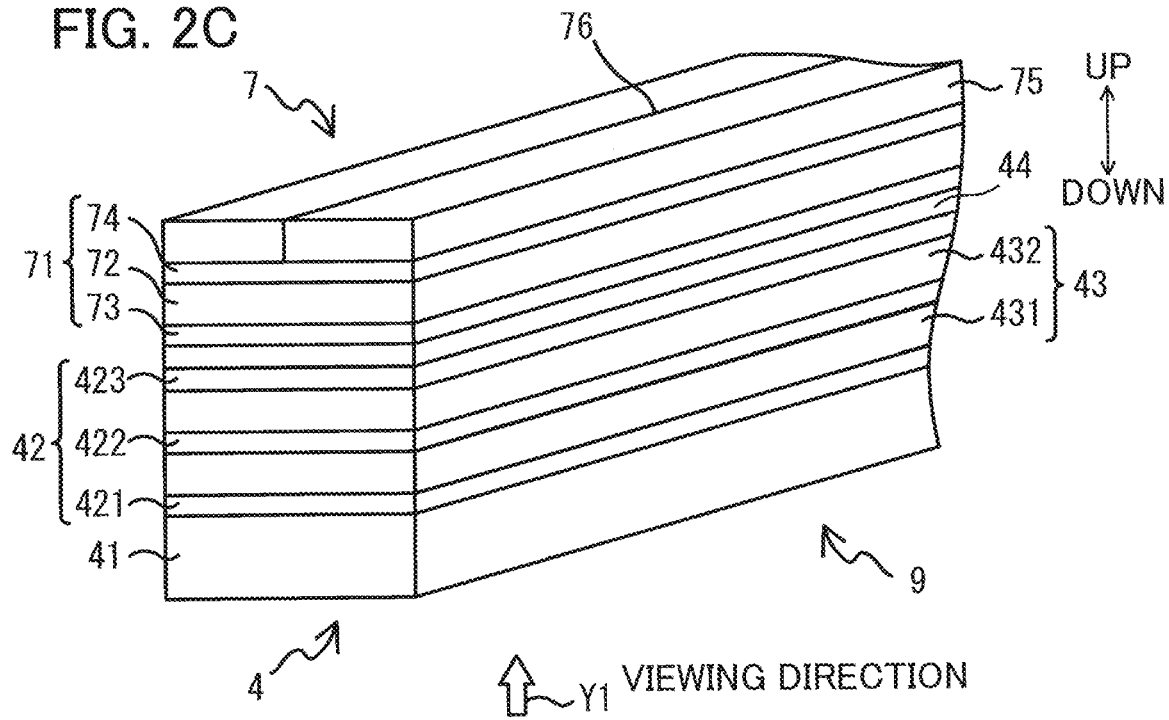
FIG. 2C is a perspective view of a label tape with the heat-sensitive tape and the adhesive tape bonded laminated together.

As shown in FIG. 2C, the label tape 9 is configured by bonding the bottom surface of the adhesive tape 7 to the top surface of the printed heat-sensitive tape 4. Accordingly, the label tape 9 includes the base material 41, first heat-sensitive layer 421. first heat-insulating layer 431, second heat-sensitive layer 422, second heat-insulating layer 432, third heat-sensitive layer 423, overcoat layer 44, first adhesive layer 73, base material 72, second adhesive layer 74, and release paper 75 that are stacked along the thickness direction in the order given.

The user views the label tape 9 from the base material 41 side (i.e., the bottom side of the label tape 9), as indicated by the viewing direction Y1 in FIG. 2C. Since the heat-sensitive tape 4 has visible light transmittance as a whole, the user can see developed colors (i.e., printed image 90) in each of the heat-sensitive layers 42 through the base material 41 and the appearance of the adhesive tape 7 as the background when viewing the label tape 9 from the base material 41 side.

Figure 3:
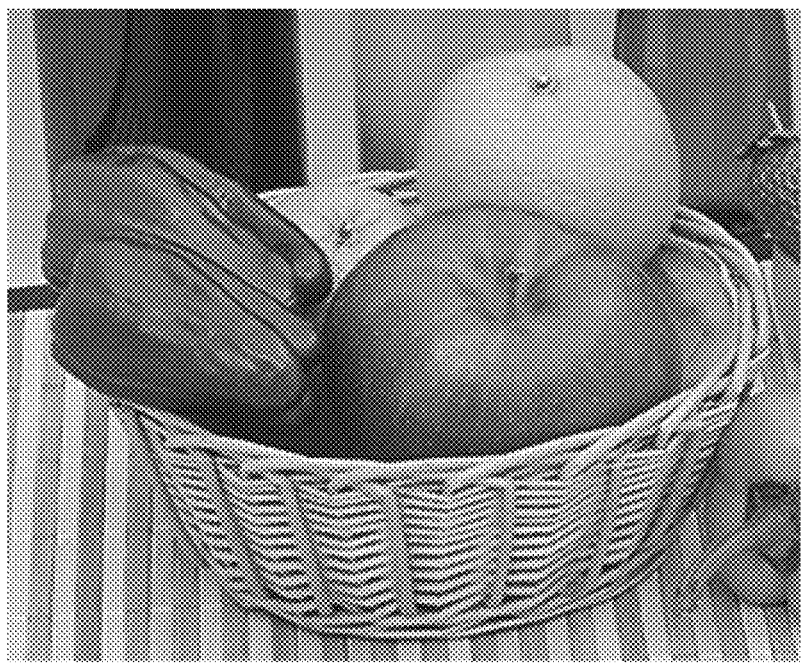
FIG. 3 shows an example of an image to be printed on the label tape.

Since the double-sided adhesive tape 71 in the present embodiment is translucent magenta, the background appears translucent magenta to a user viewing the label tape 9 from the base material 41 side. For example, if the image in FIG. 3 were printed on the heat-sensitive tape 4 without undergoing any correction and the heat-sensitive tape 4 were subsequently bonded to the adhesive tape 7, the magenta of the double-sided adhesive tape 71 would mix with the colors in the image of FIG. 3 in the resulting label tape 9 so that the user would see the image in FIG. 4.

The user can also use label tape 9 by peeling the release paper 75 off the double-sided adhesive tape 71 and affixing the label tape 9 to a given adherend 11 (a wall, mount, or the like), a separately prepared label tape 9, or the like. Hereinafter, a separately prepared label tape 9 will be called a background label tape 8. The label created by affixing a label tape 9 to the top surface of the background label tape 8 will be called a composite label 6.

Figure 4:
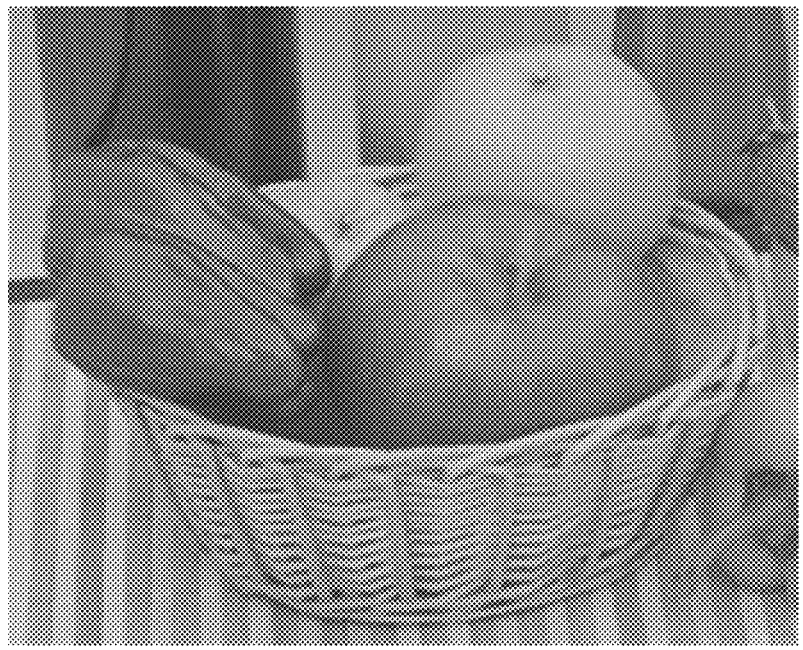
FIG. 4 shows a visual effect when the image shown in FIG. 3 is printed on the label tape.

When the adherend 11 is colored, the color of the adherend 11 is further combined with the colors in the image of FIG. 4 when viewed by the user. Thus, for a user expecting the image in FIG. 3, the colors of the label tape 9 affixed to an object may not appear as the desired colors when combined with the colors of the background, such as the double-sided adhesive tape 71, adherend 11, and the like (hereinafter called background colors).

The color of the image 90 in the label tape 9 identified by the user varies according to the color of areas in the label tape 9 other than the image 90 (hereinafter called an overlapping region 12) and the color around the label tape 9 (hereinafter called a surrounding region 13). The color of the overlapping region 12 in the first embodiment is the combined colors of the adhesive tape 7 and adherend 11. The color of the surrounding region 13 in the first embodiment is the color of the adherend 11.

Figure 5A:
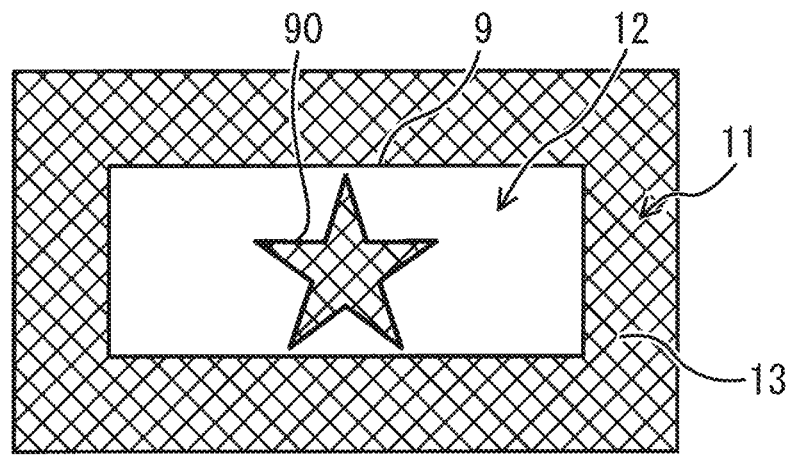
FIG. 5A is an explanatory diagram showing a visual effect when the colors of the image printed on the label tape and a surrounding region around the image are the same or similar colors.
Figure 5B:
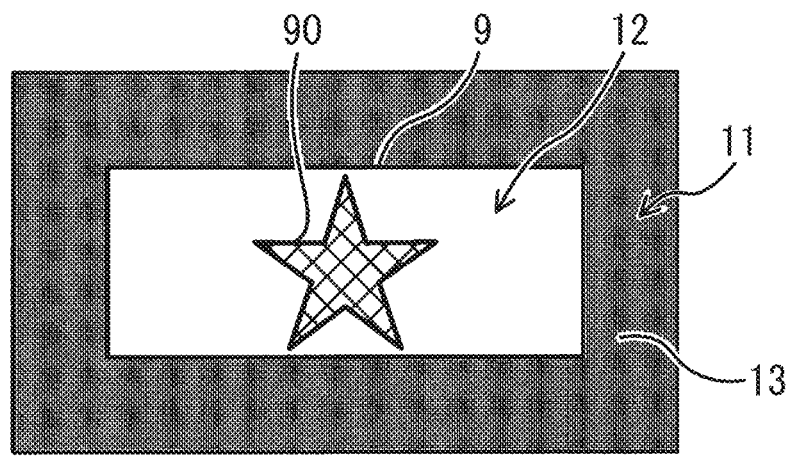
FIG. 5B is an explanatory diagram showing a visual effect when the colors of the image printed on the label tape and the surrounding region are complementary or near complementary.

If the color of the overlapping region 12 is white and the colors of the image 90 in the label tape 9 and the surrounding region 13 are the same or similar colors, as in the example of FIG. 5A, the image 90 may appear indistinct to the user. Alternatively, if the color of the overlapping region 12 is white while the colors of the image 90 and the surrounding region 13 are complementary or near complementary, as in the example of FIG. 5B, the image 90 may appear excessively accentuated to the user.

Correcting Print Data in Accordance with the Background Color

The print data generating device 1 in the present embodiment generates print data corresponding to the background color and transfers this print data to the printing device 20. By printing an image based on the print data received from the print data generating device 1, the printing device 20 can create a user-desired label tape 9 corresponding to the background color.

The range of colors that can be expressed when the printing device 20 develops color in the heat-sensitive tape 4 is determined by the types of chemicals used in the plurality of heat-sensitive layers 42, the electrical resistivity of the heating elements 10A provided in the thermal head 10, the electric current applied to the heating elements 10A, and other conditions. This color range is depicted by a one-dot chain line in FIG. 6A. Hereinafter, the reproducible color range of a printing device 20 that prints using the heat-sensitive tape 4 will be called the device color range. In FIGS. 6A through 6E, "Y" denotes yellow, "R" denotes red, "M" denotes magenta, "B" denotes blue, "C" denotes cyan, and "G" denotes green. Colors in FIGS. 6A through 6E approach a primary color (increase in saturation) when nearing a vertex and approach black (decrease in saturation) when nearing the center.

Figure 6A:
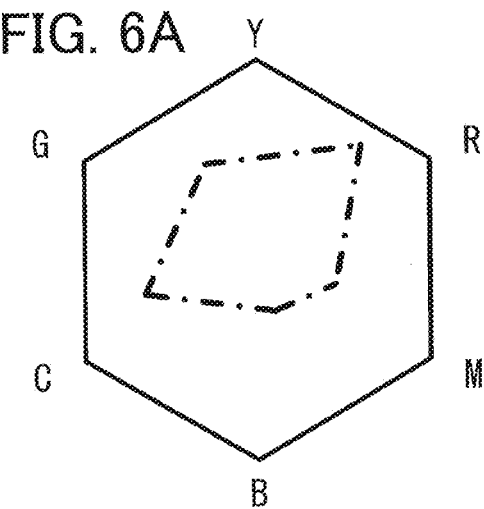
FIGS. 6A through 6E are explanatory diagrams illustrating corrections in accordance with a background color.
Figure 6B:
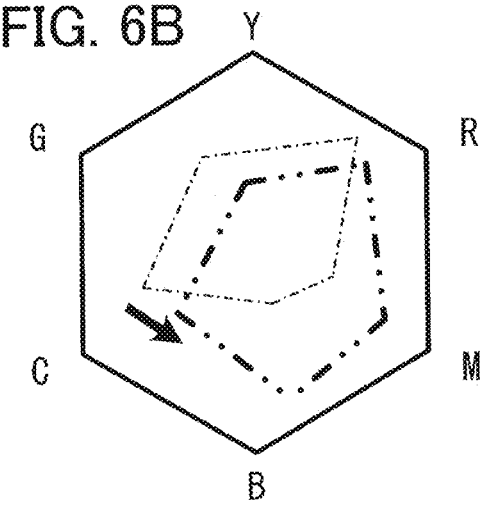
Figure 6C:
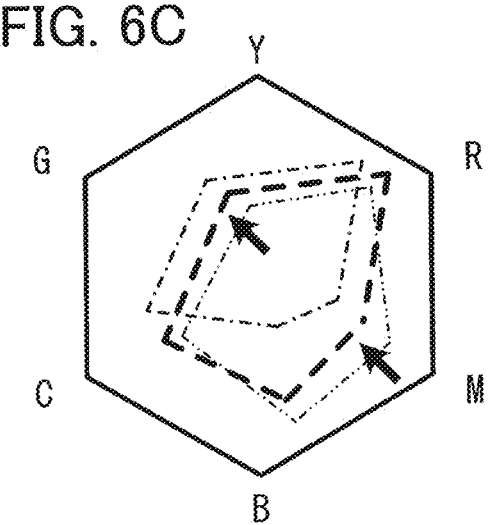

The print data generating device 1 acquires information on the background color and sets a color range reflecting this acquired background color in the device color range (the range depicted by a two-dot chain line in FIG. 6B). FIG. 6B shows the color range when magenta is reflected as the background color in the device color range.

The print data generating device 1 corrects the color range reflecting the background color based on the relationships among color in the image 90 being printed, the color of the overlapping region 12, and the color of the surrounding region 13. For example, the print data generating device 1 corrects the color range reflecting the background color in order to increase saturation of colors that are the same as or similar to the color of the surrounding region 13 and to decrease saturation of colors that are complementary or near complementary to the color of the surrounding region 13 (the range indicated by a dashed line in FIG. 6C).

This color range produced by reflecting the background color in the device color range and correcting the resulting color range based on relationships among the colors in the image 90 being printed, the color of the overlapping region 12, and the color of the surrounding region 13 will be called the composite color range. The composite color range is the color range that the user sees when the device color range is combined with the background color.

Figure 6D:
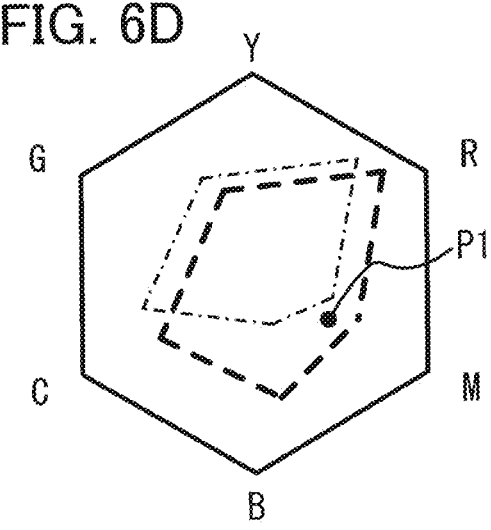
Figure 6E:
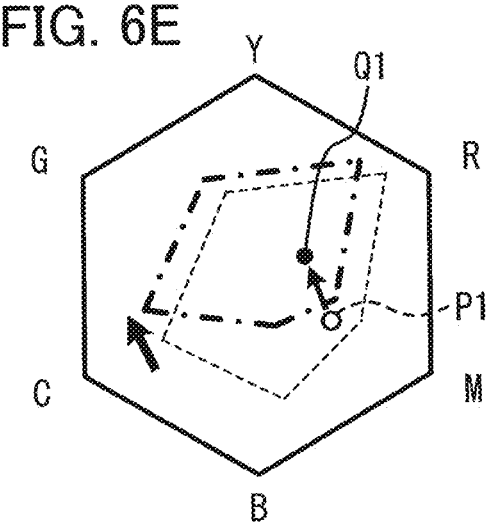

Next, the print data generating device 1 generates temporary print data. To do this, the print data generating device 1 converts the color of each pixel in the image 90 being printed to a color in the composite color range to generate dot data. FIG. 6D shows the color of dot data P1 in the temporary print data. The print data generating device 1 sets the color that the heat-sensitive tape 4 will develop for each dot by converting the dot data for each dot in the temporary print data of the composite color range to data in the device color range. Through this conversion, the print data generating device 1 generates print data to be transmitted to the printing device 20. In FIG. 6E, the color of the dot data P1 in the temporary print data has been converted to dot data QI in the device color range, setting the color to be developed in the heat-sensitive tape 4.

Composite Label 6

Figure 7A:
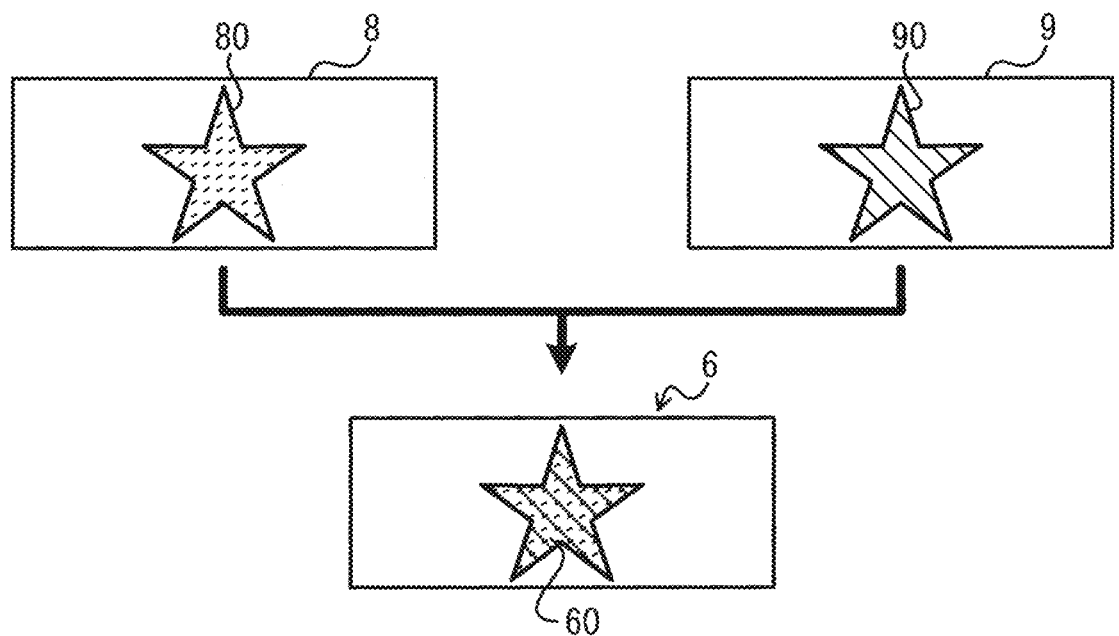
FIG. 7A is an explanatory diagram illustrating creation of a composite label with a label tape and a background label tape.
Figure 7B:
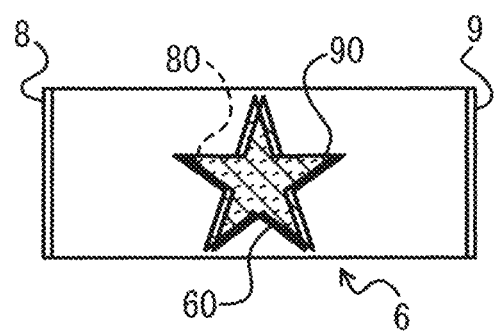
FIG. 7B is an explanatory diagram illustrating the composite label in which the position of an image printed on the label tape deviates from the position of an image printed on the background label tape.

When the user creates a composite label 6, the composite label 6 may not meet the user's desired result owing to conditions of the background label tape 8 serving as the background. In the example shown in FIG. 7A, a composite label 6 is created by peeling the release paper 75 from the top of the label tape 9, overlaying the exposed second adhesive layer 74 on the bottom, i.e., the base material 41, of the background label tape 8 and bonding the label tape 9 and the background label tape 8 together. For convenience, the following description assumes that unprinted areas of the label tape 9 (areas other than the image 90) and unprinted areas of the background label tape 8 (areas outside of a background image 80 described later) are colorless and transparent, except for the adhesive tape 7. In other words, in the present embodiment, the unprinted areas of the heat-sensitive tape 4 in the label tape 9 and unprinted areas of the heat-sensitive tape 4 in the background label tape 8 are colorless and transparent. (The same applies to FIGS. 7B and 8.)

A background image 80 is printed on the heat-sensitive tape 4 in the background label tape 8 by heat applied from the thermal head 10. The background image 80 is a yellow star shape. The image 90 is printed on the heat-sensitive tape 4 of the label tape 9 by heat applied from the thermal head 10. The image 90 is a blue star shape.

In the present embodiment, the image 90 and the background image 80 have the same size and shape, differing only in color. In the present embodiment, the shape of the image 90 is said to correspond to the shape of the background image 80 if the image 90 and background image 80 match in everything but color and if the image 90 and background image 80 match in everything but color when the image 90 is enlarged or reduced in size.

An image 60 in the composite label 6 is configured by superimposing the background image 80 in the background label tape 8 and the image 90 in the label tape 9. Areas of the heat-sensitive tape 4 in the label tape 9 other than the image 90 are colorless and transparent, and the user can see through the label tape 9 to the background label tape 8 below. The color of the image 60 appears as the combination of the blue in the image 90 and the yellow in the background image 80. The magenta of the double-sided adhesive tape 71 is seen in all areas outside the image 60 of the composite label 6.

To create the composite label 6, the user lays the label tape 9 over the background label tape 8 and bonds the label tape 9 to the background label tape 8. In some cases, the position of the image 90 may deviate from the position of the background image 80 when the label tape 9 is laid over the background label tape 8 and bonded thereto, as in the example of FIG. 7B. In such cases, the image 60 is configured by the background image 80 and image 90 superimposed in a misaligned state.

There is also a large color difference between the blue image 90 in the label tape 9 and the yellow background image 80 in the background label tape 8. Consequently, the misaligned state of the background image 80 and image 90 is more pronounced in the composite label 6. Thus, the image 60 in the composite label 6 created by laying the label tape 9 over the background label tape 8 may suffer in appearance when the position of the image 90 is offset from the position of the background image 80.

Correcting Print Data Based on Conditions of the Background Label Tape 8

The print data generating device 1 stores the shape and color of the background image 80 printed in the background label tape 8. When generating print data for the label tape 9, the print data generating device 1 determines whether a composite label 6 is to be created by superimposing the label tape 9 on the background label tape 8.

Figure 8A:
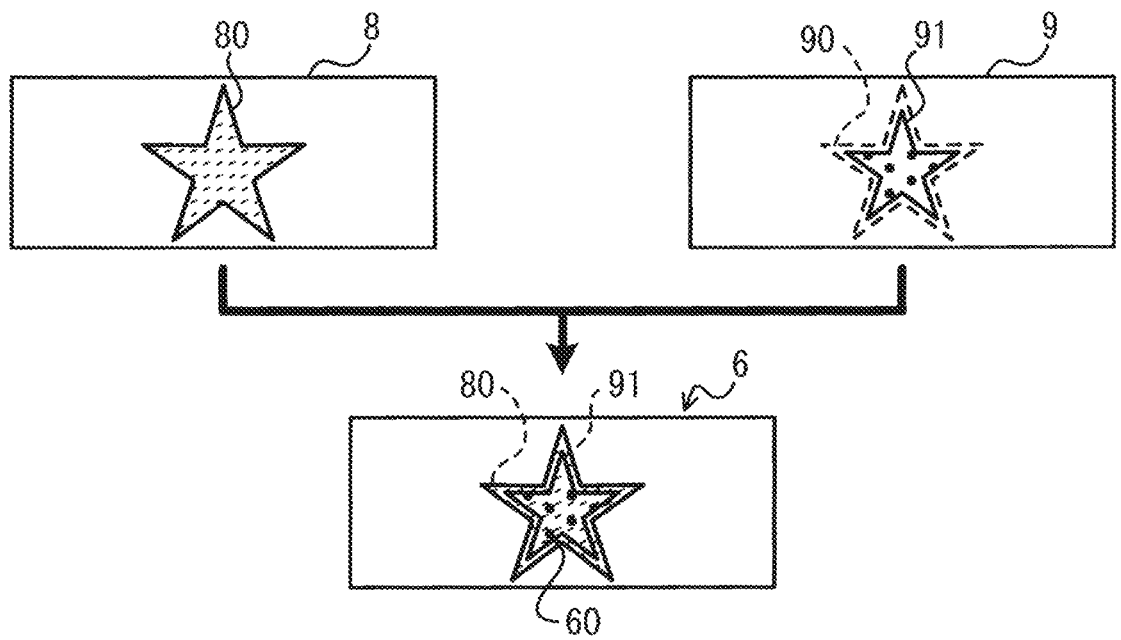
FIG. 8A is an explanatory diagram illustrating creation of the composite label by making corrections in accordance with a condition of the background label tape.
Figure 8B:
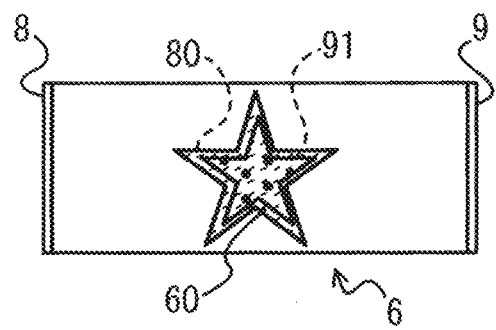
FIG. 8B is an explanatory diagram illustrating the composite label in which correction is made to the image printed on the label tape.

When identifying that the label tape 9 is to be superimposed on the background label tape 8, the print data generating device 1 determines whether the shape of the image 90 to be printed on the label tape 9 corresponds to the shape of the background image 80. If the shape of the image 90 corresponds to the shape of the background image 80, the print data generating device 1 generates a reduced image 91 by making the shape of the image 90 smaller than the shape of the background image 80, as illustrated in FIG. 8A.

Additionally, the print data generating device 1 corrects the color of the reduced image 91 seen by the user to be closer to the color of the background image 80. More specifically, the print data generating device 1 reflects the background color of the label tape 9 in the device color range (see FIG. 6B) and corrects the resulting color range based on the colors of the reduced image 91, overlapping region 12, and surrounding region 13 to define a composite color range (see FIG. 6C). The print data generating device 1 then generates temporary print data by converting the color of each pixel in the reduced image 91 to a color in the composite color range (see FIG. 6D).

The print data generating device 1 corrects the color of the dot data in the temporary print data in order to reduce the color difference between the color of the reduced image 91 and the color of the background image 80 (yellow). Next, the print data generating device 1 generates print data to be transmitted to the printing device 20 by converting the dot data in the temporary print data associated with the composite color range to dot data in the device color range.

Electrical Configuration of the Print Data Generating Device 1

Figure 9:
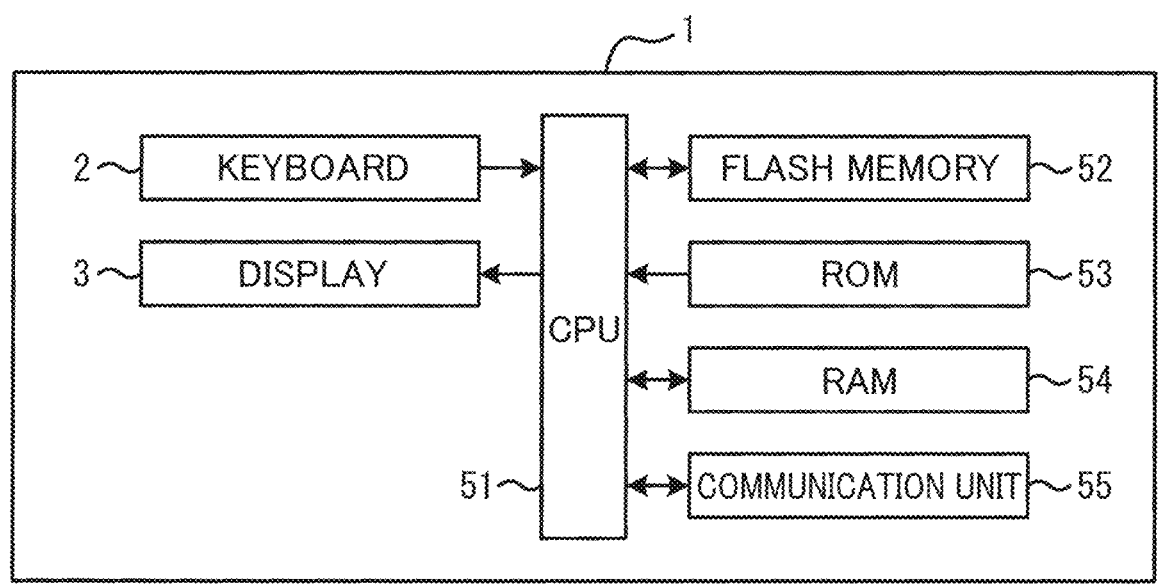
FIG. 9 is a block diagram illustrating the electrical configuration of the print data generating device.

As shown in FIG. 9, the print data generating device 1 is provided with a central processing unit (hereinafter abbreviated as "CPU") 51. The CPU 51 functions as a processor for controlling the print data generating device 1. The CPU 51 is electrically connected to a flash memory 52, a read-only memory (hereinafter abbreviated as "ROM") 53, a random-access memory (hereinafter abbreviated as "RAM") 54, a communication unit 55, a keyboard 2, and a display 3.

The flash memory 52 stores programs executed by the CPU 51, the device color range for the printing device 20, previously generated print data, and the like. The ROM 53 stores various parameters required for executing the programs. The RAM 54 stores various temporary data, such as temporary print data. The communication unit 55 is a controller for performing two-way communication with the printing device 20 through the wireless connection 99. The keyboard 2 inputs results of user operations into the CPU 51. The display 3 can display various inputted information.

Electrical Configuration of the Printing Device 20

Figure 10:
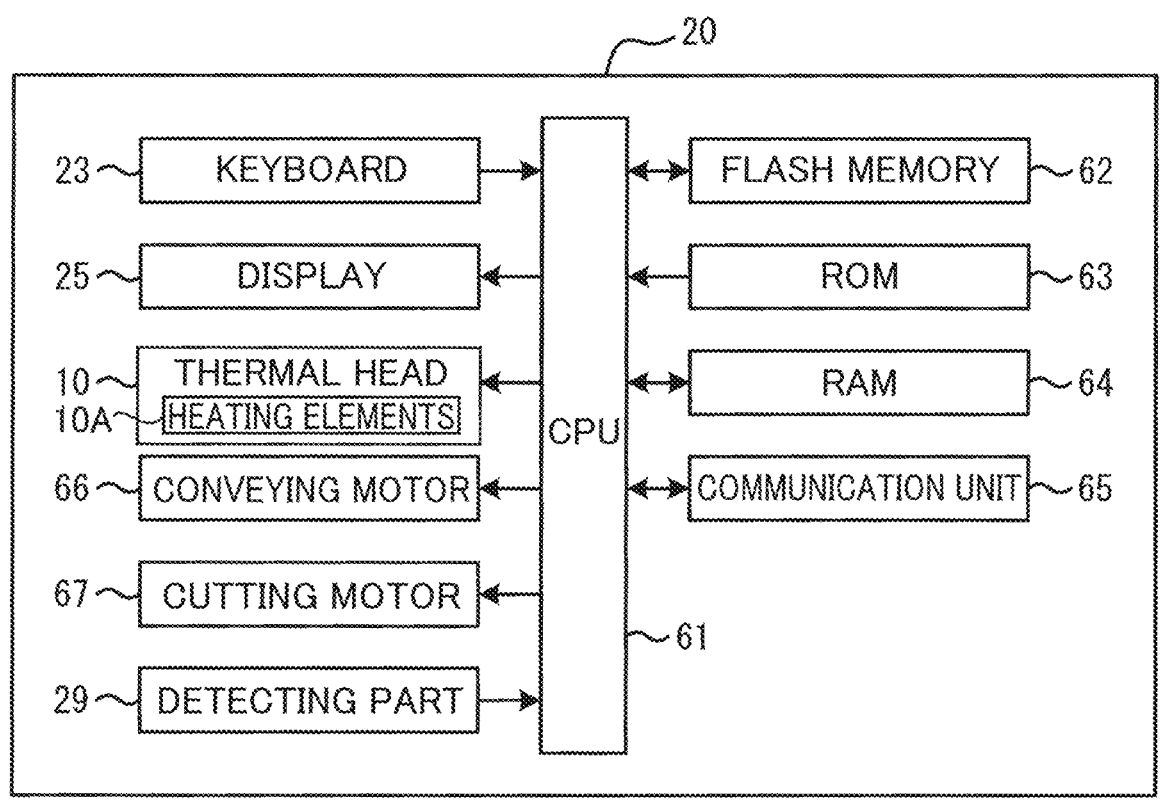
FIG. 10 is a block diagram illustrating the electrical configuration of the printing device.

As shown in FIG. 10, the printing device 20 is provided with a CPU 61. The CPU 61 functions as a processor for controlling the printing device 20. The CPU 61 is electrically connected to a flash memory 62, a ROM 63, a RAM 64, a communication unit 65, a keyboard 23, a display 25, a thermal head 10, a conveying motor 66, a cutting motor 67, and the detecting part 29.

The flash memory 62 stores programs executed by the CPU 61, and the like. The ROM 63 stores various parameters required for executing the programs. The RAM 64 stores various temporary data, such as print data used for forming images. The communication unit 65 is a controller for conducting two-way communication with the print data generating device 1 through the wireless connection 99. The keyboard 23 inputs results of user operations into the CPU 61. The display 25 can display various inputted information.

The thermal head 10 intermittently supplies electricity for heating the plurality of heating elements 10A based on the print data. The conveying motor 66 rotates the movable roller and the conveying roller in the tape cassette 30 mounted in the cassette housing section 28 to convey the heat-sensitive tape 4 and adhesive tape 7. The cutting motor 67 drives a cutting mechanism to cut the label tape 9. The detecting part 29 detects the tape type indicated by the indicator 32 and inputs this tape type into the CPU 61.

Print Data Generating Process on the Print Data Generating Device 1

When the power to the print data generating device 1 is turned on, the CPU 51 reads a program from the flash memory 52 and executes a print data generating process for generating print data. In the print data generating process, the print data generating device 1 generates print data for creating a label tape 9.

The RAM 54 stores a lamination flag that the CPU 51 uses in the print data generating process. The value of the lamination flag is set to 1 when creating a label tape 9 for lamination (e.g., a label tape 9 to be overlaid on the background label tape 8 in the composite label 6) and is set to 0 when not creating a label tape 9 for lamination.

Figure 11:
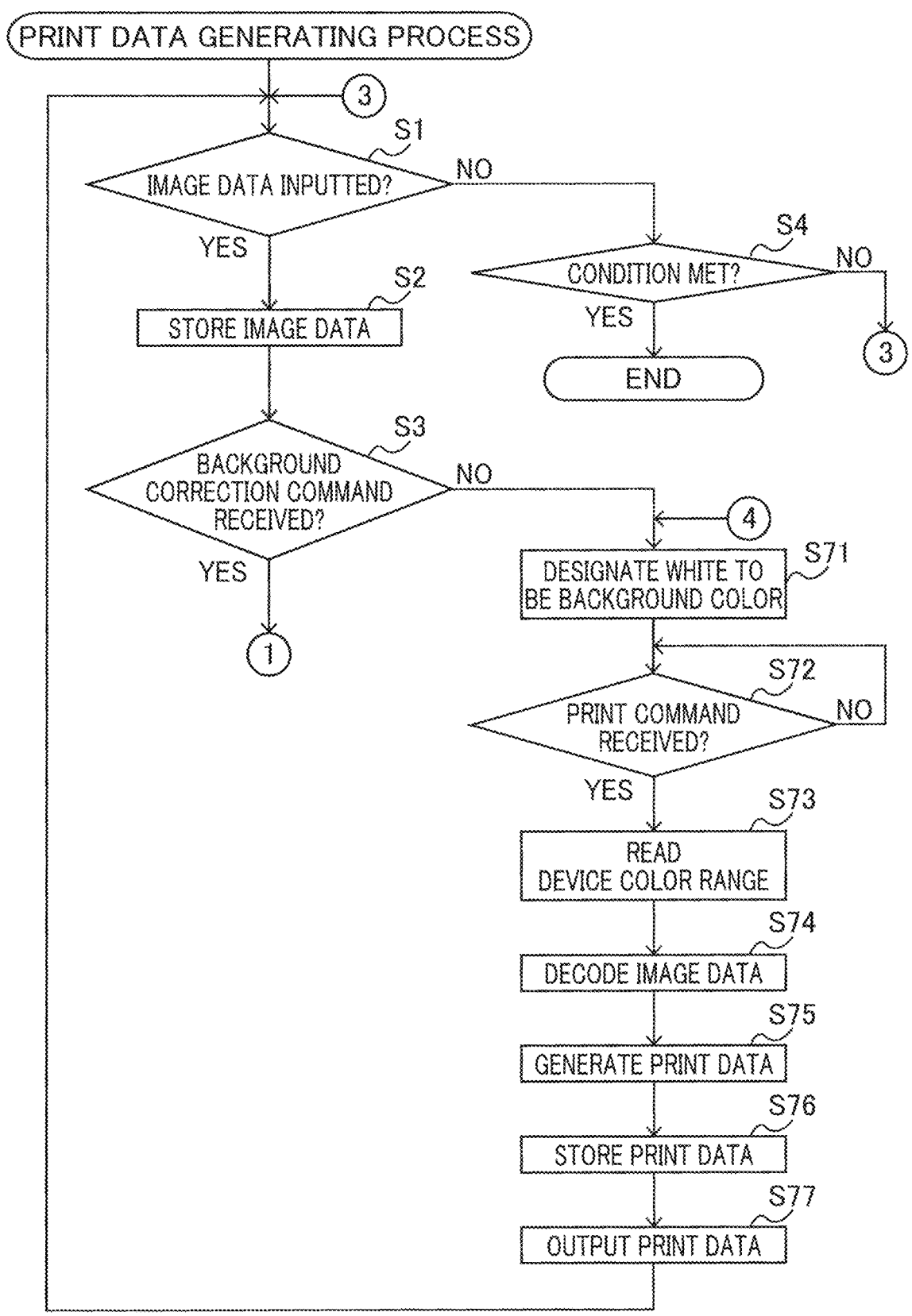
FIG. 11 is a flowchart illustrating steps in a print data generating process executed in the print data generating device.

FIG. 11 shows steps in the print data generating process. In S1 at the beginning of the print data generating process, the CPU 51 determines whether image data to be printed has been inputted. The user inputs the image data to be printed into the CPU 51 through operations on the keyboard 2. If the image data has been inputted (S1: YES), in S2 the CPU 51 stores the inputted image data in the RAM 54. The image data is stored in a form that is processible by the RAM 54. After storing the image data in S2, the CPU advances to S3.

However, if the CPU 51 determines that the image data has not been inputted (S1: NO), in S4 the CPU 51 also determines whether a condition for terminating the process is met. When the user inputs a quit command into the CPU 51 through operations on the keyboard 2 for terminating the print data generating process, for example, the CPU 51 determines that the condition for terminating the process is met (S4: YES), and completes the print data generating process. If the condition is not met (S4: NO), the CPU 51 returns to S1 and waits for the image data being inputted.

In S3 the CPU 51 determines whether a background correction command has been received. When creating a corrected label tape 9 based on conditions of the background, the user inputs a background correction command into the CPU 51 through an operation on the keyboard 2. If a background correction command has not been received (S3: NO), the CPU 51 advances to S71.

Figure 12:
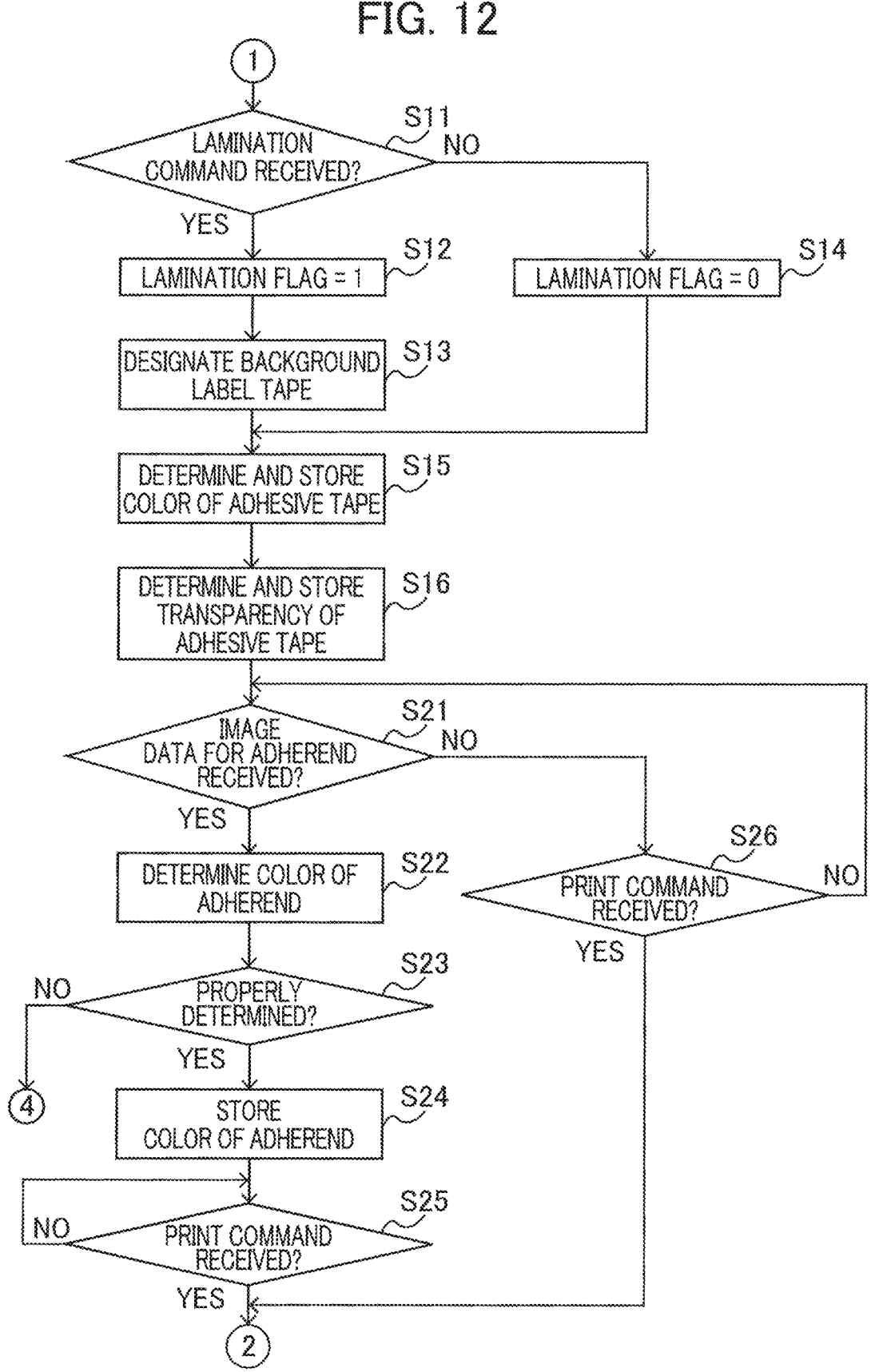
FIG. 12 is a flowchart illustrating steps in the print data generating process following the steps shown in FIG. 11.

However, if a background correction command has been received (S3: YES), in S11 of FIG. 12 the CPU 51 determines whether a lamination command has been received. Here, the CPU 51 displays a screen on the display 3 prompting the user to indicate whether a label tape 9 for lamination is being created. When a label tape 9 for lamination is being created, the user inputs a lamination command into the CPU 51 through an operation on the keyboard 2.

If a lamination command has been received (S11: YES), in S12 the CPU 51 sets the value of the lamination flag to 1. In S13 the CPU 51 performs a process to designate a background label tape 8. That is, in S13 the CPU 51 displays print data previously generated and stored in the flash memory 52 on the display 3 in the form of images. Based on the images displayed on the display 3, the user operates the keyboard 2 to designate one of the background label tapes 8 represented by the previously generated print data. Subsequently, the CPU 51 advances to S15. However, if a lamination command has not been received (S11: NO), in S14 the CPU 51 sets the value of the lamination flag to 0, and advances to S15.

In S15 the CPU 51 determines the color of the adhesive tape 7 (the double-sided adhesive tape 71) and stores this color in the flash memory 52. Specifically, the detecting part 29 of the printing device 20 detects the tape type specified by the indicator 32 of the tape cassette 30 currently mounted in the printing device 20. The CPU 61 of the printing device 20 acquires the tape type from the detecting part 29 and transmits this tape type to the communication unit 55 of the print data generating device 1 through the communication unit 65. The CPU 51 acquires the tape type via the communication unit 55, determines the color of the adhesive tape 7 based on this tape type, and stores the color in the flash memory 52. In S16 the CPU 51 also determines the transparency of the adhesive tape 7 based on the tape type and stores this transparency in the flash memory 52. Subsequently, the CPU 51 advances to S21.

In S21 the CPU 51 determines whether image data for an adherend 11 has been received. The user photographs the adherend 11 using a general-purpose external imaging device, such as a digital camera, and puts the imaging device in communication with the print data generating device 1 so that the imaging device can transmit the captured image data of the adherend 11 to the CPU 51 of the print data generating device 1. If the CPU 51 determines that image data for the adherend 11 has been received (S21: YES), in S22 the CPU 51 determines the color of the adherend 11 based on the image data for the adherend 11. In S23 the CPU 51 determines whether the color of the adherend 11 can be determined properly. If the color of the adherend 11 can be determined (S23: YES), in S24 the CPU 51 stores the color of the adherend 11 in the flash memory 52, and subsequently advances to S25. On the other hand, if the CPU 51 cannot properly determine the color of the adherend 11 for any reason, such as the received image data for the adherend 11 being corrupted (S23: NO), the CPU 51 advances to S71.

In S25 the CPU 51 determines whether a print command has been received. For example, the user inputs a print command into the CPU 51 through an operation on the keyboard 2 for directing the print data generating device 1 to generate print data and to control the printing device 20 to perform printing operations based on the print data. The CPU 51 continually loops back to S25 while determining that a print command has not been received (S25: NO).

On the other hand, if the CPU 51 determines in S21 that image data for the adherend 11 has not been received (S21: NO), the CPU 51 advances to S26. In S26 the CPU 51 determines whether a print command has been received, as in S25. If the CPU 51 determines that a print command has not been received (S26: NO), the CPU 51 returns to S21. The CPU 51 repeatedly executes the process in S21 and S26.

If the CPU 51 determines in S25 or S26 that a print command has been received (S25: YES or S26: YES), the CPU 51 advances to S31 of FIG. 13. Note that if the CPU 51 determines that a print command has been received (S26: YES) while no image data for the adherend 11 has been received (S21: NO), the CPU 51 determines that there is no adherend 11.

Figure 13:
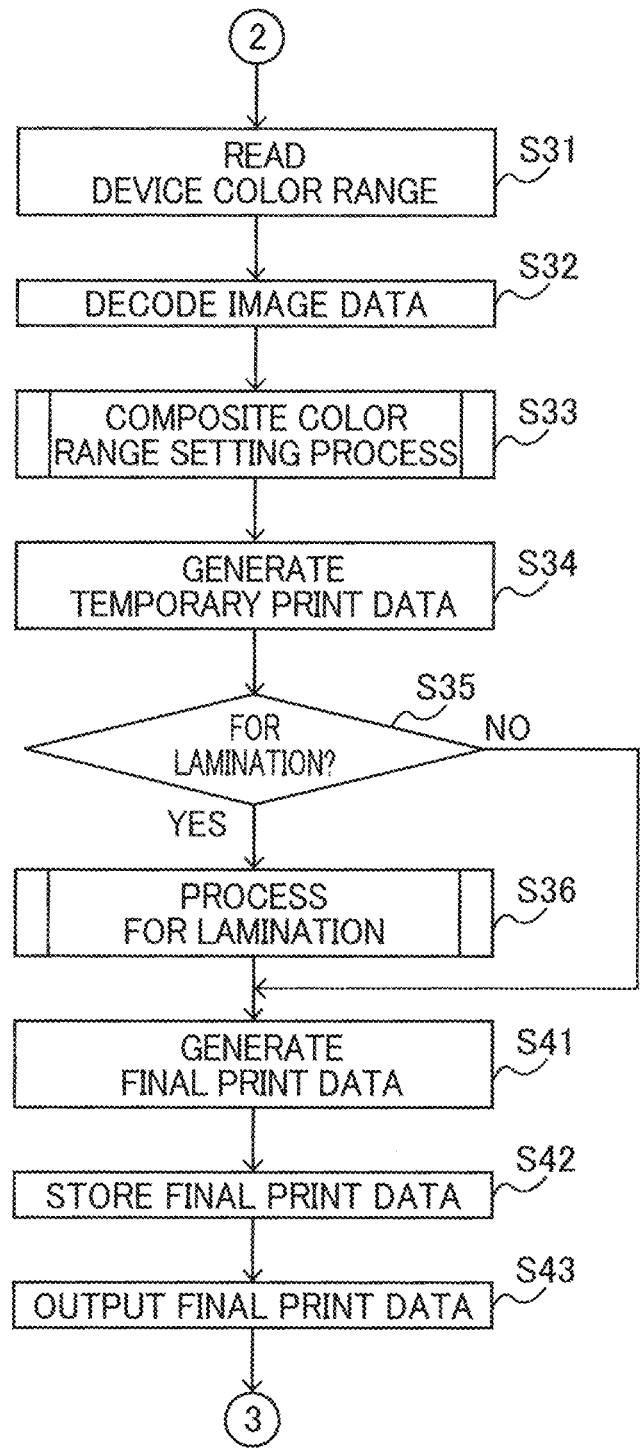
FIG. 13 is a flowchart illustrating steps in the print data generating process following the steps shown in FIG. 12.

In S31 of FIG. 13, the CPU 51 reads the device color range (the range depicted by the one-dot chain line in FIG. 6A) stored in the flash memory 52. In S32 the CPU 51 decodes the image data stored in the RAM 54 in S2. The decoded image data comprises multivalue luminance data (R, G, B) assigned to each pixel for the three color components red (R), green (G), and blue (B). In S33 the CPU 51 executes a composite color range setting process. The composite color range setting process is executed to set the color range seen by the user when the background color is reflected in the device color range.

Figure 14:
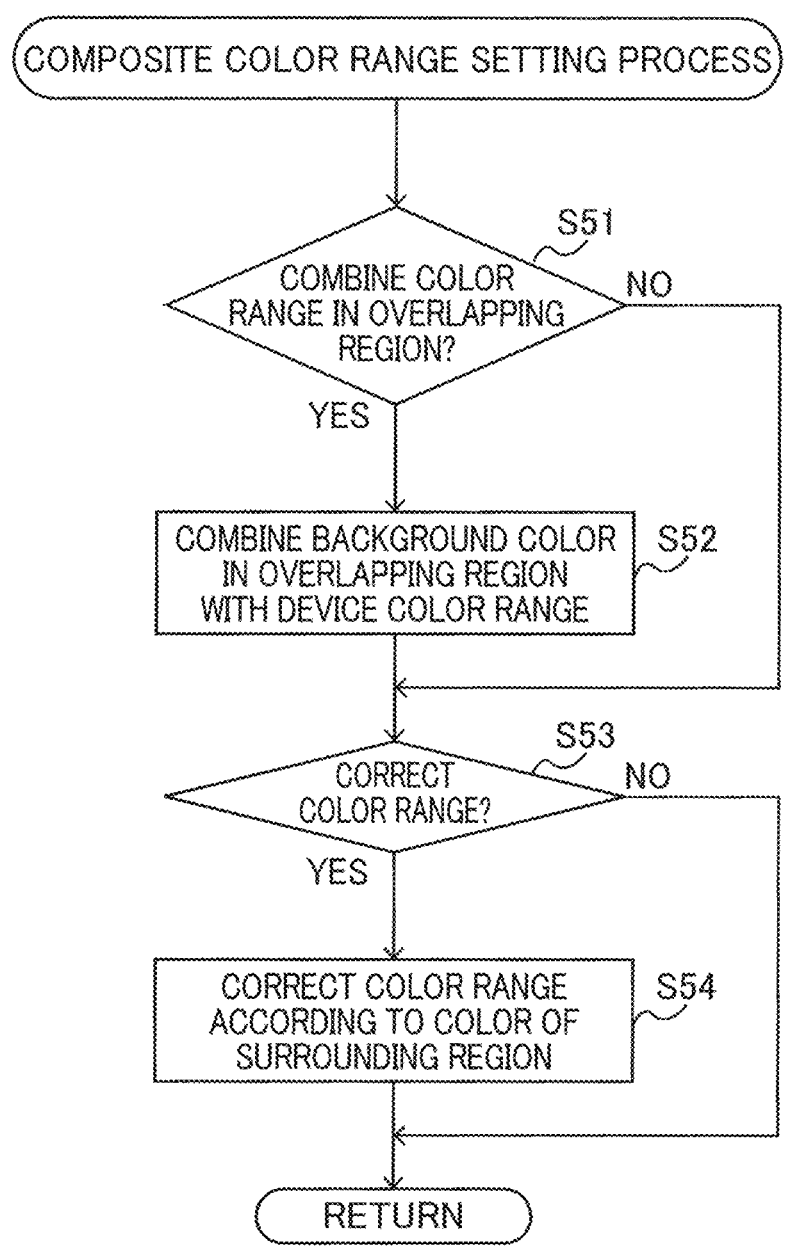
FIG. 14 is a flowchart illustrating steps in a composite color range setting process executed in the print data generating process.

FIG. 14 shows the composite color range setting process for setting a composite color range (S33 of FIG. 13). In S51 at the beginning of the composite color range setting process, the CPU 51 determines whether to combine a background color with the device color range in the overlapping region 12. The CPU 51 makes this determination based on the color and transparency of the overlapping region 12 formed by the combination of the color of the adhesive tape 7 stored in S15 (see FIG. 12), the transparency of the adhesive tape 7 stored in S16, and the color of the adherend 11 stored in S24. If a background color in the overlapping region 12 will not be combined with the device color range owing to the overlapping region 12 being colorless and transparent or some other reason (S51: NO), the CPU 51 advances to S53.

However, if a background color in the overlapping region 12 will be combined with the device color range (S51: YES), in S52 the CPU 51 updates the color range to the composite color range (the range depicted by a two-dot chain line in FIG. 6B) by reflecting the color of the overlapping region 12 in the device color range (r, g, b). Subsequently, the CPU 51 advances to S53.

In S53 the CPU 51 determines whether to correct the color range updated in S52. If the color range is not combined in S52, the CPU 51 determines not to correct the color range (S53: NO). The CPU 51 makes the determination in S53 based on the colors in the image data (the multivalue luminance data of the image data decoded in S32), the color of the overlapping region 12, and the color of the surrounding region 13 (the color of the adherend 11). If correction based on the surrounding region 13 (described below) will not be performed on the color range (S53: NO), the CPU 51 returns to the process for generating print data in FIG. 13.

When correction is to be executed on the color range (S53: YES), in S54 the CPU 51 corrects the color range so that saturation is increased for colors that are the same or nearly the same as the color of the surrounding region 13 and saturation is decreased for colors that are complementary or near complementary to the color of the surrounding region 13 relative to the color range reflecting the background color. Through the process of S54, the CPU 51 sets the composite color range (the range depicted by a dashed line in FIG. 6C). Subsequently, the CPU 51 returns to the print data generating process in FIG. 13.

Having set the composite color range (r', g', b') through the process in S33, in S34 of FIG. 13 the CPU 51 generates temporary print data. Specifically, in S34 the CPU 51 generates dot data by converting color values (R, G, B) assigned to each pixel to color values (R', G', B') in the composite color range (r', g', b') (see FIG. 6D).

In S35 the CPU 51 determines based on the value of the lamination flag whether the print data is data for creating a label tape 9 for lamination. If the CPU 51 determines that the value of the lamination flag is 0 indicating that the print data is not to be used for creating a label tape 9 for lamination (S35: NO), the CPU 51 advances to S41.

However, if the CPU 51 determines that the value of the lamination flag is 1 indicating that the print data is to be used for creating a label tape 9 for lamination (S35: YES), in S36 the CPU 51 executes a process for lamination and subsequently advances to S41. The process for lamination is performed to correct the shape and color of the image being printed based on conditions of the background label tape 8.

Figure 15:
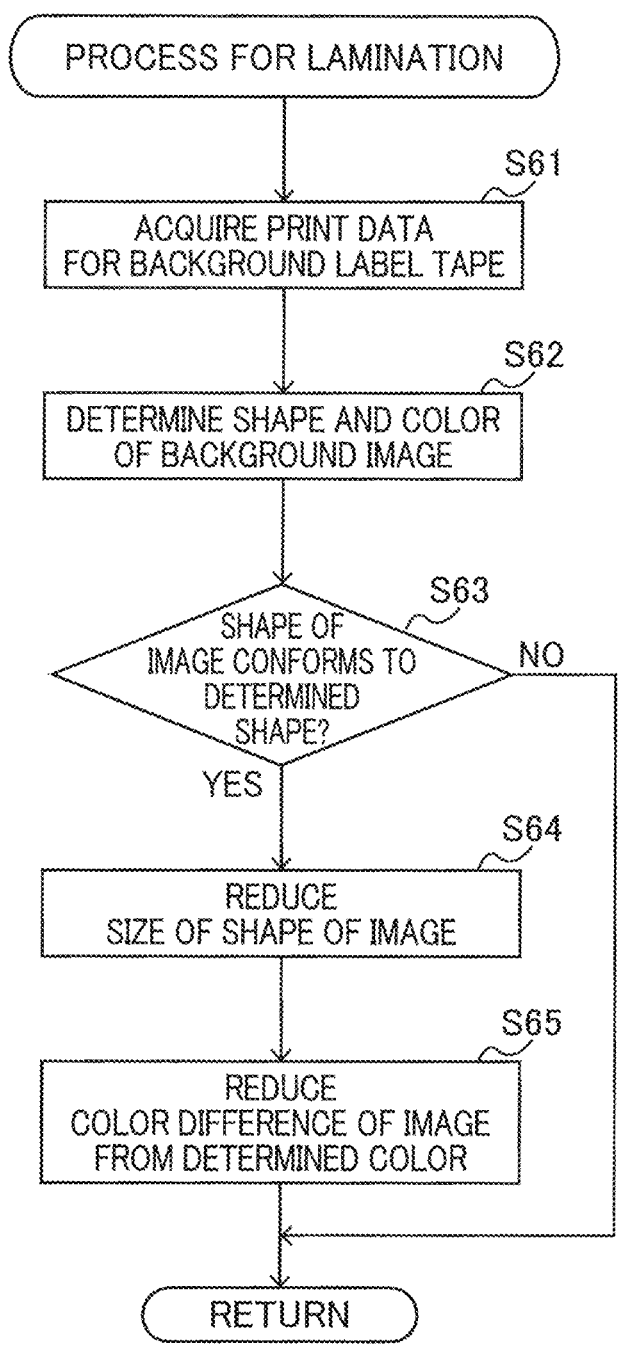
FIG. 15 is a flowchart illustrating steps in a process for lamination executed in the print data generating process.

FIG. 15 shows the process for lamination (S36 of FIG. 13). In S61 at the beginning of the process for lamination, the CPU 51 acquires print data for the background label tape 8. Specifically, in S61 the CPU 51 acquires print data for the background label tape 8 that has been designated in S13 of FIG. 12. In S62 the CPU 51 determines the shape and color of the background image 80 based on the acquired print data.

Based on the shape of the background image 80 determined in S62, the CPU 51 determines in S63 whether the shape of the image being printed conforms to the shape of the background image 80. In other words, in S63 the CPU 51 determines whether the shape of the image being printed corresponds the shape of the background image 80. If the CPU 51 determines that the shape of the image being printed does not conform to the shape of the background image 80 (S63: NO), the CPU 51 returns to the print data generating process in FIG. 13.

However, if the CPU 51 determines that the shape of the image being printed conforms to the shape of the background image 80 (S63: YES), in S64 the CPU 51 updates the temporary print data by reducing the size of the image being printed so that the shape of the image is smaller than the shape of the background image 80. In S65 the CPU 51 corrects the color of the image being printed to reduce the color difference between the colors in the image begin printed and the color of the background image 80. Subsequently, the CPU 51 returns to the process for generating print data in FIG. 13.

In S41 of FIG. 13, the CPU 51 generates final print data. The CPU 51 generates the final print data by converting color values (R', G', B') assigned to dot data for each dot in the composite color range (r', g', b') to color values (R", G", B") in the device color range (r, g, b) (see FIG. 6E) and by subsequently converting the multivalue luminance data (r, g, b) to density data (C, M, Y) having three color components of cyan (C), magenta (M), and yellow (Y).

In S42 the CPU 51 stores the final print data that is print data generated in S41 in the flash memory 52. In S43 the CPU 51 transmits the final print data to the printing device 20 via the communication unit 55. Subsequently, the CPU 51 returns to S1 of FIG. 11.

On the other hand, if the CPU 51 determines in S3 of FIG. 11 that a background correction command has not been received (S3: NO) or if the CPU 51 determines in S23 of FIG. 12 that the color of the adherend 11 cannot be determined properly (S23: NO), in S71 of FIG. 11 the CPU 51 designates white to be the background color. In S72 the CPU 51 determines whether a print command has been received. The process in S72 is identical to that in S25 of FIG. 12. The CPU 51 continually loops back to S72 while determining that a print command has not been received (S72: NO).

When the CPU 51 determines that a print command has been received (S72: YES), in S73 the CPU 51 reads the device color range stored in the flash memory 52 and in S74 decodes the image data stored in the RAM 54. Steps S73 and S74 are identical to S31 and S32 described above.

In S75 the CPU 51 generates print data. Specifically, the CPU 51 generates temporary print data by converting the color values (R, G, B) assigned to each pixel of image data representing an image to be printed to color values (R", G", B") that can be expressed in the device color range (r, g, b) to produce dot data. In S76 the CPU 51 stores the print data generated in S75 in the flash memory 52 and in S77 transmits (outputs) the print data to the printing device 20 via the communication unit 55. Subsequently, the CPU 51 returns to S1.

Label Tape Creating Process on the Printing Device 20

Upon receiving print data from the print data generating device 1, the CPU 61 of the printing device 20 reads a program from the flash memory 62 and executes a label tape creating process. In the label tape creating process, the CPU 61 controls printing operations performed by the printing device 20 based on the print data in order to create a label tape 9.

Figure 16:
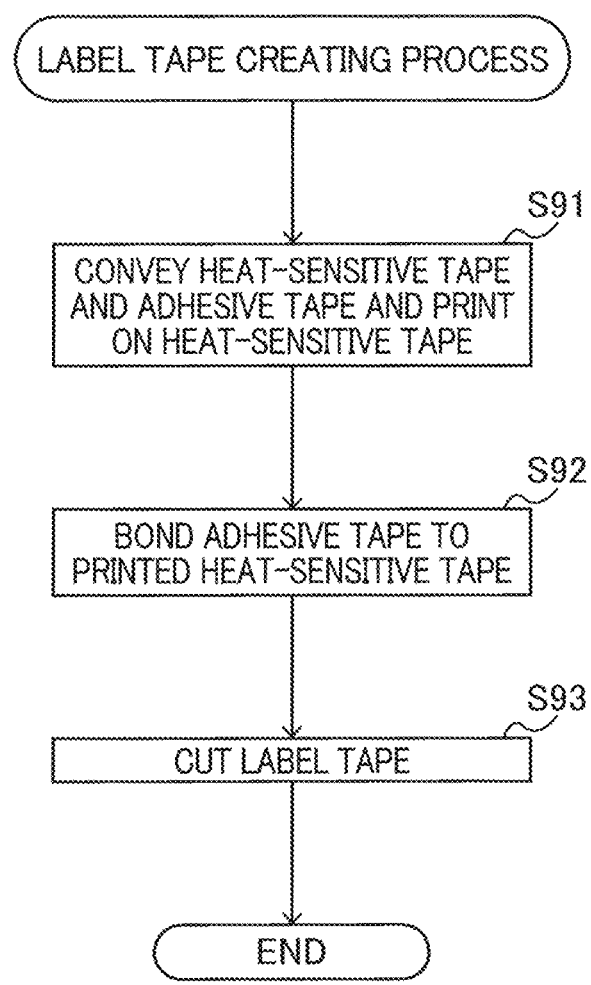
FIG. 16 is a flowchart illustrating steps in a label tape creating process executed in the printing device.

FIG. 16 shows steps in the label tape creating process. In S91 of FIG. 16, the CPU 61 performs print control based on the print data. Specifically, the CPU 61 controls the conveying motor 66 to rotate the conveying roller and the movable roller in order to convey the heat-sensitive tape 4 and adhesive tape 7. While controlling the conveying motor 66, the CPU 61 also controls the thermal head 10. Specifically, the CPU 61 selectively heats the plurality of heating elements 10A while the heat-sensitive tape 4 is conveyed. At this time, the thermal head 10 heats the heat-sensitive layers 42 in the heat-sensitive tape 4 from the first surface side of the base material 41. More specifically, the thermal head 10 heats the heat-sensitive layers 42 in the heat-sensitive tape 4 from the opposite side of the heat-sensitive layers 42 from the base material 41. Accordingly, printing is performed on the heat-sensitive tape 4.

In S92 the CPU 61 performs a control process to bond the adhesive tape 7 to the printed heat-sensitive tape 4. Specifically, the CPU 61 controls the conveying motor 66 to rotate the conveying roller and the movable roller, thereby conveying the printed heat-sensitive tape 4 and the adhesive tape 7. The adhesive tape 7 is bonded to the printed heat-sensitive tape 4 from the first surface side of the base material 41 between the conveying roller and movable roller, thereby creating the label tape 9. More specifically, the adhesive tape 7 is bonded to the printed heat-sensitive tape 4 on the opposite side of the heat-sensitive tape 4 from the base material 41. In S93 the CPU 61 controls the cutting motor 67 to cut the label tape 9 with the cutting mechanism. This completes the label tape creation process.

Principal Effects of the Present Embodiment

The print data generating device 1 generates print data for controlling the printing device 20 to print an image. The printing device 20 prints the image by controlling heating elements 10A in the thermal head 10 to heat the heat-sensitive tape 4 based on the print data, thereby creating the label tape 9. The heat-sensitive tape 4 has the base material 41, the plurality of heat-sensitive layers 42, the plurality of heat-insulating layers 32, and the overcoat layer 44. All layers of the heat-sensitive tape 4 are transparent. The heat-sensitive layers 42 are provided on the first surface side of the base material 41 and include the third heat-sensitive layer 423. The third heat-sensitive layer 423 produces a third color (yellow) when heated to a third temperature or higher. The print data generating device 1 determines conditions of the adhesive tape 7 (double-sided adhesive tape 71), adherend 11, background tape 8, and the like (S15, S16, S22, and S62) constituting the background that will be superimposed on the heat-sensitive tape 4. The print data generating device 1 generates print data (S31 through S41) based on determination results for conditions of the adhesive tape 7, adherend 11, background label tape 8, and the like.

Thus, the print data generating device 1 generates print data based on conditions of the background of the heat-sensitive tape 4. The print data generating device 1 transmits this print data to the printing device 20, and the printing device 20 prints an image on the heat-sensitive tape 4 based on the received print data. In this way, the user can create a desired label tape 9 in conformance with the background.

The heat-sensitive tape 4 is also provided with the first heat-sensitive layer 421 and second heat-sensitive layer 422, which are the heat-sensitive layers 42 disposed between the base material 41 and the third heat-sensitive layer 423. The first heat-sensitive layer 421 produces a first color (cyan) when heated to a first temperature or higher. The second heat-sensitive layer 422 produces a second color (magenta) when heated to a second temperature or higher. Through combinations of the third color produced in the third heat-sensitive layer 423, the first color produced in the first heat-sensitive layer 421, and the second color produced in the second heat-sensitive layer 422, the heat-sensitive tape 4 can express diverse color tones. Therefore, the print data generating device 1 can generate print data for printing images having diverse color tones.

The print data generating device 1 determines the background color (S15, S22, and S62). If the double-sided adhesive tape 71 is translucent magenta, for example, the background appears translucent magenta to a user viewing the label tape 9 from the base material 41 side. If the image in the example of FIG. 3 were printed on the heat-sensitive tape 4 without undergoing any correction and the heat-sensitive tape 4 were subsequently bonded to the adhesive tape 7, the user would see an image such as that shown in FIG. 4 with the color of the double-sided adhesive tape 71 as the background. The print data generating device 1 generates print data conforming to the background color and transmits this print data to the printing device 20. By performing printing operations based on this print data, the printing device 20 can create a user-desired label tape 9 that conforms to the background color.

The print data generating device 1 determines the color of the adherend 11 (S22). In this case, the print data generating device 1 generates print data corresponding to the color of the adherend 11 and transmits the print data to the printing device 20. By using the printing device 20 to print an image based on this print data, the user can create a user-desired label tape 9 conforming to the color of the adherend 11.

The label tape 9 is configured by bonding the bottom surface of the adhesive tape 7 to the top surface of the heat-sensitive tape 4. The adhesive tape 7 is provided with the double-sided adhesive tape 71, and the double-sided adhesive tape 71 has the base material 72, first adhesive layer 73, and second adhesive layer 74. The print data generating device 1 determines the color of the adhesive tape 7 (the double-sided adhesive tape 71; S15). In this case, the print data generating device 1 generates print data based on the color of the adhesive tape 7 and transmits the print data to the printing device 20. By using the printing device 20 to print an image based on this print data, the user can create a user-desired label tape 9 conforming to the color of the adhesive tape 7.

The print data generating device 1 can also be configured to allow the printing device 1 to perform printing operations without correcting print data based on conditions of the background (S71 through S77). In this case, the print data generating device 1 designates the background color to be white (S71) and generates print data independent of the background color. This simplifies the process executed by the print data generating device 1, enabling the print data generating device 1 to generate print data quickly.

The flash memory 52 of the print data generating device 1 stores the reproducible device color range when the printing device 20 prints using the heat-sensitive tape 4. The print data generating device 1 sets a composite color range by reflecting the background color in the device color range (S33). The print data generating device 1 generates temporary print data by converting color values assigned to each pixel in the color range of the image data to color values in the composite color range (S34). The print data generating device 1 generates final print data by converting the dot data in the temporary print data based on the composite color range to dot data in the device color range (S41). In this case, the print data generating device 1 reflects the color of the background area in the device color range to generate temporary print data based on the composite color range and converts this temporary print data to final print data based on the device color range. This process suppresses color changes perceived by the user as a result of the background color, as in the example of FIG. 4.

The print data generating device 1 corrects the color range resulting from reflecting the background color in the device color range (S54). Specifically, in S54 the print data generating device 1 corrects the color range reflecting the background color to increase saturation for colors that are the same or nearly the same as the color of the surrounding region 13 and to decrease saturation for colors that are complementary or near complementary to the color of the surrounding region 13. This correction suppresses the color of the surrounding region 13 from changing the color of the image 90 in the label tape 9 perceived by the user.

The CPU 51 of the print data generating device 1 acquires via the wireless connection 99 the tape type detected by the detecting part 29 of the printing device 20 and determines the color of the adhesive tape 7 based on this tape type (S15). If instead the user were responsible for inputting the tape type through an operation on the keyboard 2, for example, there may be times that the user incorrectly identifies the tape type. In such cases, it is possible that the user could verify whether the label tape 9 has been created in conformance with background conditions for the heat-sensitive tape 4 by repeatedly generating print data and performing a printing operation on the printing device 20. However, since the print data generating device 1 in the present embodiment acquires the tape type specified by the indicator 32, the tape type will not be misidentified as a result of the user's perception. Hence, the print data generating device 1 can suppress the user from having to verify repeatedly whether the label tape 9 has been created based on background conditions for the heat-sensitive tape 4.

The CPU 51 of the print data generating device 1 receives via the wireless connection 99 image data for the adherend 11 that has been photographed by a general-purpose external imaging device (S21: YES). The print data generating device 1 determines the color of the adherend 11 based on the image data received for the adherend 11 (S22). Since the user can easily provide information to the print data generating device 1 specifying the color of the adherend 11 that will serve as the background for the heat-sensitive tape 4, convenience of using the print data generating device 1 is improved.

The print data generating device 1 generates print data based on conditions of the background label tape 8 (S36). Accordingly, when creating a label tape 9 for lamination, the user can create a desired label tape 9 conforming to conditions of the background label tape 8.

The print data generating device 1 sequentially stores generated print data in the flash memory 52 (S42, S76). The print data generating device 1 designates one set of print data as print data for a background label tape 8 from among previously generated print data stored in the flash memory 52 (S13). The print data generating device 1 determines the shape of the background image 80 based on the designated print data for the background label tape 8 (S82). In this case, the print data generating device 1 generates print data conforming to the shape of the background image 80 and transmits this print data to the printing device 20. By using the printing device 20 to print an image based on the received print data, the user can create a desired label tape 9 that conforms to the shape of the background image 80.

The print data generating device 1 determines whether the shape of the printed image corresponds to the shape of the background image 80 (S63). If the print data generating device 1 determines that the shape of the printed image corresponds to the shape of the background image 80 (S63: YES), the CPU 51 generates reduced image data by setting the shape of the printed image smaller than the shape of the background image 80 (S64) and converts the color for each dot. This process makes positional deviation between the background image 80 and image 90 more tolerable when the user overlays the label tape 9 on the background label tape 8 (see FIG. 8B). Accordingly, this method suppresses a diminished appearance of the image 60 in the composite label 6 if the position of the image 90 is offset relative to the background image 80 when the label tape 9 is overlaid on the background label tape 8.

The print data generating device 1 sequentially stores generated print data in the flash memory 52 (S42, S76). The print data generating device 1 designates print data for a background label tape 8 from the stored print data (S13) and determines the color of the background label tape 8 (S62). In this case, the print data generating device 1 generates print data suited to the color of the background label tape 8 and transmits this print data to the printing device 20. By using the printing device 20 to perform printing operations based on this print data, the user can create a desired label tape 9 that conforms to the color of the background label tape 8.

The print data generating device 1 determines the shape of the background image 80 (S62) and determines whether the shape of the printed image corresponds to the shape of the background image 80 (S63). When the print data generating device 1 determines that the shape of the printed image corresponds to the shape of the background image 80 (S63: YES), the print data generating device 1 corrects the colors in the printed image to have less color difference from the color of the background image 80 (S65). This method suppresses deviation between the background image 80 and image 90 from being more pronounced if the position of the image 90 relative to the background image 80 is offset when the label tape 9 is overlaid on the background label tape 8. Therefore, the print data generating device 1 can suppress a decline in the appearance of the image 60 in the composite label 6 if the position of the image 90 relative to the background image 80 is offset when the label tape 9 is overlaid on the background label tape 8.

Corresponding Descriptions

In the embodiment described above, the print data generating device 1 is an example of the claimed print data generating device. The label tape 9 is an example of the claimed printed medium. The printing device 20 is an example of the claimed printing device. The thermal head 10 is an example of the claimed thermal head. The heating elements 10A are examples of the claimed heating element. The heat-sensitive tape 4 is an example of the claimed heat-sensitive medium. The base material 41 is an example of the claimed base material. The third heat-sensitive layer 423 is an example of the claimed first heat-sensitive layer. The third temperature is an example of the claimed first temperature. The CPU 51 is an example of the controller of the print data generating device. The adhesive tape 7 (the double-sided adhesive tape 71), the adherend 11, and the background label tape 8 are examples of the claimed background area. The first heat-sensitive layer 421 and the second heat-sensitive layer 422 are examples of the claimed second heat-sensitive layer. The first temperature and the second temperature are examples of the claimed second temperature. The adherend 11 is an example of the claimed adherend. The adhesive tape 7 is an example of the claimed adhesive medium. The base material 72 is an example of the claimed adhesive base material. The first adhesive layer 73 and the second adhesive layer 74 are examples of the claimed adhesive layer. The flash memory 52 is an example of the claimed memory. The overlapping region 12 is an example of the claimed first region. The surrounding region 13 is an example of the claimed second region. The background label tape 8 is an example of the claimed background printed medium. The image 90 is an example of the claimed target image. The background image 80 is an example of the claimed background image. The operating mode of the print data generating device 1 in which the CPU 51 executes steps S31 through S41 is an example of the first mode. The operating mode of the print data generating device 1 in which the CPU 51 executes steps S71 through S75.

Variations of the Embodiment

While the description has been made in detail with reference to specific embodiment, it would be apparent to those skilled in the art that many modifications and variations may be made thereto.

For example, the structure of the printing system 100 and the number of devices included in the printing system 100 may be modified as needed. The CPU 61 of the printing device 20 in the printing system 100 may execute the print data generating processor generating print data. In this case, the printing system 100 need not be provided with the print data generating device 1. Further, the print data generating device 1 and keyboard 2 may communicate via a Universal Serial Bus (USB) cable.

The print data generating device 1 need not be provided with the display 3, but instead may be capable of communicating with a standalone display device, for example. The print data generating device 1 also need not be provided with the keyboard 2, and the results of user operations may be inputted into the CPU 51 by inputting means other than the keyboard 2 instead. The print data generating device 1 is not limited to a personal computer, but may be a smartphone, for example.

The print data generating device 1 may generate print data that assigns a color patch to an area in the margin of the label tape 9 outside the image represented by the image data. The color of the color patch includes at least one of the colors red, blue, green, cyan, magenta, yellow, and black. In this case, the print data generating device 1 can identify a relative change in color by simultaneously acquiring the color of the background region and the color of the color patch. Accordingly, the print data generating device 1 can generate print data that considers a more accurate background color.

The user may also manually bond the adhesive tape 7 to the printed heat-sensitive tape 4. In this case, the printing device 20 need not be provided with a mechanism for bonding the adhesive tape 7 to the heat-sensitive tape 4. Additionally, a portion of the top surface, bottom surface, and side surfaces of the cassette case 31 may be omitted. The conveying roller also need not be rotatable and may be a fixed columnar body or a plate-shaped body, for example. The drive force of the conveying motor 66 need not be transmitted to the movable roller. The printing device 20 need not be provided with the keyboard 23 and display 25. The tape cassette 30 may be built into the printing device 20 rather than being detachably mountable therein. In this case, the printing device 20 need not be provided with the cassette housing section 28.

The first adhesive layer 73 and second adhesive layer 74 may be opaque or may be translucent or transparent. The visible light transmittance of the base material 72 may be higher than the visible light transmittance of each layer of the heat-sensitive tape 4 or may be higher than the visible light transmittance of any layer of the heat-sensitive tape 4.

The adhesive tape 7 in the embodiment described above may be configured of the base material 72 and first adhesive layer 73. In this case, the user may apply adhesive to the surface of the base material 72 on the side opposite the first adhesive layer 73 (i.e., the exposed surface) after completion of the label tape 9, for example. Alternatively, the adhesive tape 7 may be self-adhesive.

The score line 76 in the embodiment described above need not be formed in a straight line, but may be formed in a wavy line or the like. Further, a plurality of score lines 76 juxtaposed in the widthwise direction may be formed in the release paper 75 rather than just a single score line 76. Alternatively, a plurality of score lines 76 extending laterally (in the widthwise direction) may be formed at prescribed intervals in the longitudinal direction of the release paper 75. The score lines 76 may also extend obliquely to the widthwise and longitudinal directions.

The base material 41 in the embodiment described above may be a foamed PET film. Alternatively, the base material 41 may be a resin film formed of polyethylene (PE), polypropylene (PP), ethylene vinyl acetate (EVA) copolymer, ethylene methacrylic acid (EMAA) copolymer, polybutene (PB), polybutadiene (BDR), polymethylpentene (PMP), polyethylene naphthalate (PEN), polybutylene terephthalate (PBT), polyimide (PI), polyetherimide (PEI), polyetherketone (PEK), polyether ether ketone (PEEK), nylon (NY), polyamide (PA), polycarbonate (PC), polystyrene (PS), foamed/expanded polystyrene (FS/EPS), polyvinyl chloride (PVC), polyvinylidene chloride (PVDC), saponified ethylene vinyl alcohol (EVOH), polyvinyl alcohol (PVA), plain transparent (PT) cellophane, moisture-proof sealable transparent (MST) cellophane, polyacrylonitrile (PAN), vinylon (VL), polyurethane (PU), triacetyl cellulose (TAC), or the like. In these cases, the base material 41 may be a foamed or a non-foamed resin film.

Since foamed resin has lower thermal conductivity than the same resin that is not foamed, the thermal conductivity of the base material 41 can be lowered through a simple construction when the base material 41 is configured of a foamed resin film. When the base material 41 has low thermal conductivity, heat inputted into the heat-sensitive tape 4 from the heat-sensitive layer 42 side is less likely to be diffused in the base material 41 when printing with the printing device 20. Accordingly, using a foamed resin film as the base material 41 can reduce the quantity of heat needed to be inputted into the heat-sensitive tape 4 for developing color in the heat-sensitive layers 42 through a simple configuration. In other words, by using a foamed resin film for the base material 41, the quantity of heat inputted into the heat-sensitive tape 4 for producing color in the heat-sensitive layers 42 can be reduced without needing to use a special material in the base material 41 for reducing thermal conductivity.

When the adhesive tape 7 is bonded to the heat-sensitive tape 4 after the printing device 1 has performed printing operations on the heat-sensitive tape 4, the base material 41 functions as a laminate member for protecting the heat-sensitive layers 42. If the base material 41 has low thermal conductivity, the base material 41 can better suppress unintended discoloration in the heat-sensitive layers 42 caused by heat inputted into the base material 41 side than when the base material 41 is formed of material having high thermal conductivity.

When the base material 41 is configured of a non-foamed resin film, the visible light transmittance of the base material 41 tends to be higher than when the base material 41 is formed of a foamed resin film. Accordingly, the printed image in the label tape 9 will appear clear and distinct to the user.

Provided that the base material 41 has sufficient visible light transmittance for its application, the base material 41 may be formed of a metal foil (aluminum foil or copper foil), a vacuum metalized (VM) film, or the like, or may be configured of one of various types of paper, such as translucent paper, washi (traditional Japanese paper), wood-free paper, dust-free paper, glassine, clay-coated paper, resin-coated paper, laminated paper (polyethylene-laminated paper, polypropylene-laminated paper, etc.), synthetic paper, kraft paper, and the like. The first protective layer 591 may also be formed of a nonwoven cloth or a glass cloth, for example.

The overcoat layer 44 may be made of a material identical to that of the heat-insulating layer 43. In other words, another heat-insulating layer (third heat-insulating layer, not shown) may be provided as the overcoat layer 44. Alternatively, the overcoat layer 44 may be omitted. In this case, thermal conductivity from the thermal heat 10 to the plurality of heat-sensitive layers 42 is enhanced. Accordingly, the printing device 20 can shorten a heating period by the thermal head 10, and can reduce the cost required for the overcoat layer 44.

In the embodiment described above, the heat-sensitive tape 4 has a plurality of heat-sensitive layers 42, but the heat-sensitive tape 4 may instead have just a single heat-sensitive layer. In this case, the base material 41, first heat-sensitive layer 421, first heat-insulating layer 431, and overcoat layer 44 are laminated in the order given, for example. After printing has been performed on the heat-sensitive tape 4, the adhesive tape 7 having the score line 76 is bonded to the opposite side of the heat-sensitive tape 4 from the base material 41. Accordingly, this tape cassette 30 can suppress deterioration in print quality due to the score line 76.

Note that when the heat-sensitive tape 4 possesses just a single heat-sensitive layer, both the first heat-insulating layer 431 and the overcoat layer 44 may be omitted. In this case, the single heat-sensitive layer may be formed by applying a chemical agent to the top surface of the base material 41.

The plurality of heat-sensitive layers 42 in the embodiment described above may be configured of just two layers. In other words, the third heat-sensitive layer 423 may be omitted and, hence, the second heat-insulating layer 432 may also be omitted. In this case, the first heat-sensitive layer 421 may be formed by applying a chemical agent to the bottom surface of the first heat-insulating layer 431 while the second heat-sensitive layer 422 is formed by applying a chemical agent to the top surface of the first heat-insulating layer 431. Thus, it is sufficient for the heat-sensitive tape 4 to include at least one heat-insulating layer.

Alternatively, the plurality of heat-sensitive layers 42 in the embodiment described above may be configured of four or more layers. For example, a fourth heat-sensitive layer (not shown) may be provided on the opposite side of the third heat-sensitive layer 423 from the second heat-sensitive layer 422. In this case, the fourth heat-sensitive layer develops a fourth color when heated to a fourth temperature or higher. The fourth temperature is higher than the third temperature. The fourth color may be black, for example. In this configuration, a third heat-insulating layer (not shown) is provided between the third heat-sensitive layer 423 and the fourth heat-sensitive layer in the thickness direction.

The first color, second color, and third color in the embodiment described above may be colors other than cyan, magenta, and yellow, respectively. For example, the first, second, and third colors may all be the same color. When multiple layers of the same color are superimposed in the label tape 9, the label tape 9 can depict depth in the formed image.

In the embodiment described above, the plurality of heat-sensitive layers 42 may be formed by applying a chemical agent to the top surfaces of the heat-insulating layers 43. Alternatively, the heat-sensitive layers 42 may be preformed in a sheet-like shape and bonded by adhesive to the respective heat-insulating layers 43.

Figure 17A:
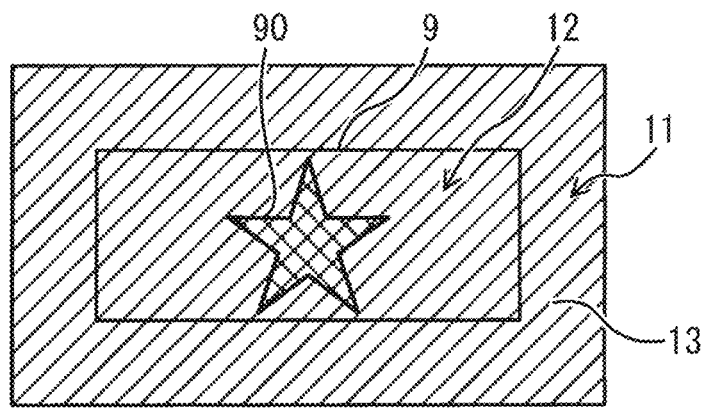
FIGS. 17A and 17B are explanatory diagrams each illustrating a label tape created in accordance with a background pattern.
Figure 17B:
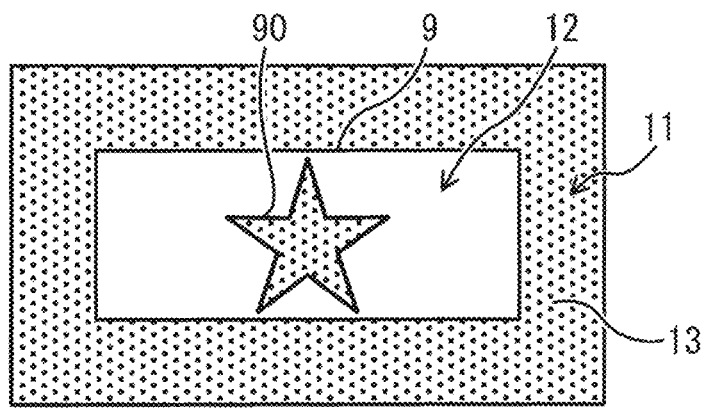

The print data generating device 1 may determine other conditions of the background than the color of the background (the adhesive tape 7, adherend 11, and the like) and the shape and color of the background image 80 described in the embodiment in order to generate print data. For example, the print data generating device 1 may determine the pattern of the background and may generate print data corresponding to this background pattern. In the example of FIG. 17A, diagonal hatching at forty-five degrees is formed on the adherend 11 constituting the background. The color of the adherend 11 is white. The adhesive tape 7 is colorless and transparent. The print data generating device 1 determines that diagonal hatching at forty-five degrees is formed on the adherend 11 based on image data for the adherend 1l and generates print data to depict diagonal hatching at one-hundred-thirty-five degrees in the image 90. Since the hatching on the adherend 11 can be seen in the image 90 of the label tape 9 when the label tape 9 is printed based on this print data, the forty-five-degree hatching and one-hundred-thirty-five-degree hatching form a grid pattern in the image 90. In the example of FIG. 17B, the print data generating device 1 determines that a dot pattern is formed on the adherend 11 and generates print data so as to form the same dot pattern as the adherend 11 in the image 90.

In the process of S1 described in the embodiment described above, the user may input image data for an image photographed by a general-purpose external imaging device (a digital camera, for example) into the CPU 51 if the external imaging device is capable of conducting two-way communication with the print data generating device 1. The external imaging device is placed in communication with the print data generating device 1, and the image data is transmitted to the CPU 51 from the external imaging device. Similarly, in the processes of S15 and S22, means other than those described in the embodiment (such as a user operation on the keyboard 2) may be used to input the tape type (the color of the adhesive tape 7) and image data for the adherend 11 (the color of the adherend 11) into the CPU 51. Further, it is sufficient to execute just one of the processes in S15, S16, S22, and S62, while those processes not executed may be omitted.

When the CPU 51 cannot determine the color of the adhesive tape 7 in S15, and when the CPU 51 cannot determine the transparency of the adhesive tape 7 in S16, the CPU 51 may simply advance to S71 and not generate print data corrected based on conditions of the background, as when the CPU 51 cannot properly determine the color of the adherend 11 in S22 (S23: NO). After the CPU 51 has designated the background label tape 8 in S13, the CPU 51 may determine the shape and color of the background image 80 in the background label tape 8 before a print command is received. In this case, the process of S62 may be omitted.

The print data generating device 1 may skip the process in S71 through S77 and may execute either of the process in S33 or the process in S34 and S36. When the process of S33 is omitted, the print data generating device 1 need not determine the color of the surrounding region 13 attributed to the adherend 11.

In the process of S41, the CPU 51 need only convert the temporary print data in the composite color range to print data in the device color range and need not further convert this print data in the device color range to density data (C, M, Y). Alternatively, after converting the temporary print data in the composite color range to print data in the device color range in the process of S41, the CPU 51 may further convert this print data in the device color range to density data (C, M, Y, K) that includes black (K) in addition to cyan, magenta, and yellow. Alternatively, after converting the temporary print data in the composite color range to print data in the device color range in the process of S41, the CPU 51 may perform a halftone process on the print data using an error diffusion method or a dither method. For example, if the CPU 51 determines in S22 that the background image 80 is gray in color, the CPU 51 sets the color of the image 90 developed in the heat-sensitive layers 42 to black and perform the halftone process in S41 in order to create a label tape 9 for lamination.

The device color range, the shape of the background image 80, and the color of the background label tape 8 need not be stored in the flash memory 52 but instead may be stored on a server connected to a network. The CPU 51 may then download this information from the server when executing the process for generating print data.

In place of the CPU 51 and CPU 61, the print data generating device 1 and printing device 20 may employ a microcomputer, application-specific integrated circuits (ASICs), field-programmable gate arrays (FPGAs), or the like as the processor. Each of the print data generating process and label tape creating process may be a distributed process performed by a plurality of processors. The non-transitory storage medium may be any storage medium capable of holding information, regardless of the duration that the information is stored. The non-transitory storage medium need not include transitory storage media (conveyed signals, for example). The program may be downloaded from a server connected to a network (i.e., transmitted as a transmission signal) and stored in the flash memory 52 and flash memory 62, for example. In this case, the program may be saved in a non-transitory storage medium, such as a hard disk drive provided in the server.

The variations described above may be combined in any way that does not produce inconsistencies.

What is claimed is:

1. A print data generating device configured to generate print data for creating a printed medium by printing a target image on a heat-sensitive medium with a printing device, the printing device including a thermal head having a heating element, the heat-sensitive medium including: a base material; and a first heat-sensitive layer, the base material having a transparency and including one surface, the first heat-sensitive layer being provided over the one surface of the base material, the first heat-sensitive layer being configured to develop a first color when heated to a first temperature or higher, the printing device being configured to control the heating element according to the print data to heat the heat-sensitive medium, the print data generating device comprising:

a controller configured to perform:
(a) acquiring information on a background area on which the heat-sensitive medium is to be superimposed;
(b) determining a condition of the background area based on the information acquired in (a); and
(c) generating the print data in accordance with the condition of the background area determined in (b).

2. The print data generating device according to claim 1, wherein the heat-sensitive medium further includes a second heat-sensitive layer provided between the base material and the first heat-sensitive layer, the second heat-sensitive layer being configured to develop a second color when heated to a second temperature or higher, the second color being different from the first color, the second temperature being different from the first temperature.

3. The print data generating device according to claim 1, wherein the condition of the background area includes a color of the background area.

4. The print data generating device according to claim 3, wherein the condition of the background area includes a color of an adherend on which the printed medium is to be overlaid.

5. The print data generating device according to claim 3, wherein the printed medium is configured by bonding an adhesive medium to the heat-sensitive medium on one of: an opposite side of the first heat-sensitive layer from the base material; and an opposite side of the base material from the first heat-sensitive layer,
wherein the adhesive medium includes an adhesive base material and an adhesive layer provided over the adhesive base material, and
wherein the condition of the background area includes at least one of: a color of the adhesive base material; and a color of the adhesive layer.

6. The print data generating device according to claim 3, wherein the controller is configured to further perform:
(d) designating the color of the background area to be white; and
(e) generating the print data in accordance with the color of the background area designated in (d), and
wherein the print data generating device is provided with:
a first mode in which the (a) acquiring, the (b) determining, and the (c) generating are performed for generating the print data; and
a second mode in which the (d) designating and the (e) generating are performed for generating the print data.

7. The print data generating device according to claim 3, further comprising:
a memory configured to store color range information indicating a first color range that the heat-sensitive medium can reproduce when heated,
wherein the (c) generating comprises:
(f) setting a second color range by reflecting the color of the background area determined in (b) in the first color range;
(g) generating temporary print data for printing the target image based on the second color range set in (f); and
(h) converting the temporary print data to final print data for printing the target image based on the first color range.

8. The print data generating device according to claim 3, wherein the background area includes: a first region on which the printed medium is to be superimposed; and a second region around the first region, and wherein the (c) generating generates the print data based on at least one of: a color of the first region; and a color of the second region.

9. The print data generating device according to claim 1, wherein the (a) acquiring acquires the information on the background area captured by an external terminal device having an imaging function.

10. The print data generating device according to claim 1, wherein the (c) generating generates the print data which assigns a color patch to an area in a margin of the printed medium outside the target image, the color patch including at least one of colors red, blue, green, cyan, magenta, yellow, and black.

11. The print data generating device according to claim 1, wherein the background area includes a background printed medium which has been printed in advance.

12. The print data generating device according to claim 11, further comprising:
 a memory configured to store shape information indicating a shape of a background image printed on the background printed medium,
 wherein the condition of the background area includes the shape of the background image,
 wherein the (a) acquiring acquires the shape information stored in the memory, and
 wherein the (b) determining determines the shape of the background image based on the shape information acquired in (a).

13. The print data generating device according to claim 12, wherein the (b) determining comprises:
 (i) determining whether a shape of the target image conforms to the shape of the background image, and
 wherein the (c) generating comprises:
 (j) generating, in response to determining in (i) that the shape of the target image conforms to the shape of the background image, the print data setting the shape of the target image to be smaller than the shape of the background image.

14. The print data generating device according to claim 11, further comprising:
 a memory configured to store color information indicating a color of the background printed medium,
 wherein the condition of the background area includes the color of the background printed medium,
 wherein the (a) acquiring comprises:
  (k) acquiring the color information stored in the memory, and
 wherein the (b) determining comprises:
  (l) determining the color of the background printed medium based on the color information acquired in (k).

15. The print data generating device according to claim 14, wherein the (c) generating comprises:
 (m) generating the print data setting a color of the target image to be developed when the heat-sensitive medium is heated closer to the color of the background printed medium determined in (l).

16. A printing device configured to print a target image on a heat-sensitive medium, the heat-sensitive medium including: a base material; and a first heat-sensitive layer, the base material having a transparency and including one surface, the first heat-sensitive layer being provided over the one surface of the base material, the first heat-sensitive layer being configured to develop a first color when heated to a first temperature or higher, the printing device comprising:
 a thermal head comprising a heating element; and
 a controller configured to perform:

(a) acquiring information on a background area on which the heat-sensitive medium is to be superimposed;
 (b) determining a condition of the background area based on the information acquired in (a);
 (c) generating print data for printing the target image in accordance with the condition of the background area determined in (b); and
 (d) controlling, in accordance with the print data generated in (c), an amount of heat generated by the heating element to print the target image on the heat-sensitive medium.

17. The printing device according to claim 16, wherein the heat-sensitive medium further includes a second heat-sensitive layer provided between the base material and the first heat-sensitive layer, the second heat-sensitive layer being configured to develop a second color when heated to a second temperature or higher, the second color being different from the first color, the second temperature being different from the first temperature.

18. The printing device according to claim 16, wherein the condition of the background area includes a color of the background area.

19. The printing device according to claim 18, wherein the condition of the background area includes a color of an adherend on which the printed medium is to be overlaid.

20. The printing device according to claim 18, wherein the printed medium is configured by bonding an adhesive medium to the heat-sensitive medium on one of: an opposite side of the first heat-sensitive layer from the base material; and an opposite side of the base material from the first heat-sensitive layer,
 wherein the adhesive medium includes: an adhesive base material; and an adhesive layer provided over the adhesive base material, and
 wherein the condition of the background area includes at least one of: a color of the adhesive base material; and a color of the adhesive layer.

21. The printing device according to claim 18, wherein the controller is configured to further perform:
 (e) designating the color of the background area to be white; and
 (f) generating the print data in accordance with the color of the background area designated in (e), and
 wherein the print data generating device is provided with:
 a first mode in which the (a) acquiring, the (b) determining and the (c) generating are performed for generating the print data; and
 a second mode in which the (e) designating and the (f) generating are performed for generating the print data.

22. The printing device according to claim 18, further comprising:
 a memory configured to store color range information indicating a first color range that the heat-sensitive medium can reproduce when heated,
 wherein the (c) generating comprises:
  (g) setting a second color range by reflecting the color of the background area determined in (b) in the first color range;
  (h) generating temporary print data for printing the target image based on the second color range set in (g); and
  (i) converting the temporary print data to final print data for printing the target image based on the first color range.

23. The printing device according to claim 18, wherein the background area includes: a first region on which the printed medium is to be superimposed; and a second region around the first region, and wherein the (c) generating generates the print data based on at least one of: a color of the first region; and a color of the second region.

24. The printing device according to claim 16, wherein the (a) acquiring acquires the information on the background area captured by an external terminal device having an imaging function.

25. The printing device according to claim 16, wherein the (c) generating generates the print data which assigns a color patch to an area in a margin of the printed medium outside the target image, the color patch including at least one of colors red, blue, green, cyan, magenta, yellow, and black.

26. The printing device according to claim 16, wherein the background area includes a background printed medium which has been printed in advance.

27. The printing device according to claim 26, further comprising:

a memory configured to store shape information indicating a shape of a background image printed on the background printed medium, wherein the condition of the background area includes the shape of the background image, wherein the (a) acquiring acquires the shape information stored in the memory; and wherein the (b) determining determines the shape of the background image based on the shape information acquired in (a).

28. The printing device according to claim 27, wherein the (b) determining comprises:

(j) determining whether a shape of the target image conforms to the shape of the background image, and wherein the (c) generating comprises:

(k) generating, in response to determining in (j) that the shape of the target image conforms to the shape of the background image, the print data setting the shape of the target image to be smaller than the shape of the background image.

29. The printing device according to claim 26, further comprising:

a memory configured to store color information indicating a color of the background printed medium, wherein the condition of the background area includes the color of the background printed medium, wherein the (a) acquiring comprises:

(l) acquiring the color information stored in the memory, and wherein the (b) determining comprises:

(m) determining the color of the background printed medium based on the color information acquired in (l).

30. The printing device according to claim 29, wherein the (c) generating comprises:

(n) generating the print data setting a color of the target image to be developed when the heat-sensitive medium is heated closer to the color of the background printed medium determined in (m).

* * * * *